(12) United States Patent
Botte

(10) Patent No.: US 8,216,437 B2
(45) Date of Patent: *Jul. 10, 2012

(54) ELECTROCHEMICAL CELL FOR OXIDATION OF AMMONIA AND ETHANOL

(75) Inventor: Gerardine G. Botte, Athens, OH (US)

(73) Assignee: Ohio University, Athens, OH (US)

( * ) Notice: Subject to any disclaimer, the term of this patent is extended or adjusted under 35 U.S.C. 154(b) by 343 days.

This patent is subject to a terminal disclaimer.

(21) Appl. No.: 12/114,779

(22) Filed: May 4, 2008

(65) Prior Publication Data

US 2008/0318097 A1  Dec. 25, 2008

Related U.S. Application Data

(63) Continuation-in-part of application No. 10/962,894, filed on Sep. 24, 2007, now Pat. No. 7,485,211, which is a continuation-in-part of application No. PCT/US2006/007641, filed on May 8, 2006.

(60) Provisional application No. 60/916,222, filed on May 4, 2007, provisional application No. 60/510,473, filed on Oct. 10, 2003, provisional application No. 60/974,766, filed on Sep. 24, 2007.

(51) Int. Cl.
  *C25B 9/08* (2006.01)
(52) U.S. Cl. .......................... 204/266; 204/252; 204/263
(58) Field of Classification Search .................. 204/252, 204/266, 263
  See application file for complete search history.

(56) References Cited

U.S. PATENT DOCUMENTS

| | | | |
|---|---|---|---|
| 3,650,838 A * | 3/1972 | Giner et al. ................... | 429/501 |
| 3,947,333 A | 3/1976 | Bianchi et al. | |
| 3,956,107 A | 5/1976 | Mitchell, III | |
| 4,226,683 A | 10/1980 | Vaseen | |
| 4,345,982 A | 8/1982 | Ikawa et al. | |
| 4,388,162 A | 6/1983 | Sammells et al. | |
| 4,419,208 A | 12/1983 | Gray | |
| 4,453,594 A | 6/1984 | Patton et al. | |
| RE31,824 E | 2/1985 | D'Agostino et al. | |
| 4,498,962 A | 2/1985 | Oda et al. | |
| 4,643,809 A | 2/1987 | Botts et al. | |
| 4,725,339 A | 2/1988 | Bindra et al. | |
| 5,795,699 A | 8/1998 | Zhou et al. | |
| 5,954,928 A | 9/1999 | Kishi et al. | |

(Continued)

FOREIGN PATENT DOCUMENTS

EP  1 408 569 A2  4/2004

(Continued)

OTHER PUBLICATIONS

International Search Report and Written Opinion, PCT/US 08/62590, mailed Feb. 12, 2009 (#1 of 2 that were mailed).

(Continued)

*Primary Examiner* — Bruce Bell
(74) *Attorney, Agent, or Firm* — Wood, Herron & Evans, LLP

(57) ABSTRACT

An electrochemical cell for causing a reaction that produces hydrogen, the electrochemical cell comprising: a first electrode comprising: at least one layered electrocatalyst formed of at least one active metal layer deposited on a carbon support, wherein the at least one active metal layer is active to a target species; a second electrode comprising a conductor; a basic electrolyte; ammonia, ethanol, or combinations thereof; and electrical current in communication with the first electrode.

15 Claims, 13 Drawing Sheets

U.S. PATENT DOCUMENTS

| | | | |
|---|---|---|---|
| 6,099,704 | A | 8/2000 | Bacquet et al. |
| 6,135,126 | A | 10/2000 | Joshi |
| 6,238,530 | B1 | 5/2001 | Yoshida et al. |
| 6,248,467 | B1 | 6/2001 | Wilson et al. |
| 6,531,050 | B1 | 3/2003 | Waite |
| 6,533,919 | B1 | 3/2003 | Narayanan et al. |
| 6,627,035 | B2 | 9/2003 | Fan et al. |
| 6,764,589 | B1 | 7/2004 | Puetter |
| 6,828,057 | B2 | 12/2004 | Ovshinsky et al. |
| 6,972,160 | B2 | 12/2005 | Okada et al. |
| 7,098,163 | B2 | 8/2006 | Hampden-Smith et al. |
| 7,144,476 | B2 | 12/2006 | Wilde et al. |
| 7,485,211 | B2 | 2/2009 | Botte et al. |
| 2002/0037446 | A1 | 3/2002 | Iyer |
| 2002/0132154 | A1 | 9/2002 | Adzic et al. |
| 2003/0070910 | A1 | 4/2003 | Otsuka et al. |
| 2003/0089620 | A1* | 5/2003 | Reichman et al. ............ 205/637 |
| 2003/0226763 | A1 | 12/2003 | Narayanan et al. |
| 2004/0151896 | A1 | 8/2004 | Houda et al. |
| 2005/0211569 | A1 | 9/2005 | Botte et al. |
| 2006/0135359 | A1* | 6/2006 | Adzic et al. ................... 502/326 |
| 2006/0228606 | A1 | 10/2006 | Fiebig et al. |
| 2006/0234039 | A1 | 10/2006 | Bose et al. |
| 2006/0269824 | A1 | 11/2006 | Hampden-Smith et al. |
| 2006/0292434 | A1 | 12/2006 | Hampden-Smith et al. |
| 2007/0077491 | A1 | 4/2007 | Burchardt |
| 2008/0314755 | A1 | 12/2008 | Botte |
| 2008/0318097 | A1 | 12/2008 | Botte |
| 2009/0050489 | A1 | 2/2009 | Botte |
| 2009/0081500 | A1 | 3/2009 | Botte |

FOREIGN PATENT DOCUMENTS

| | | |
|---|---|---|
| EP | 1408569 A2 | 4/2004 |
| WO | 02/44081 A1 | 6/2002 |
| WO | 2002044081 A1 | 6/2002 |
| WO | 2004/061163 A2 | 7/2004 |
| WO | 2005035444 A2 | 4/2005 |
| WO | 2005038967 A1 | 4/2005 |
| WO | 2006/005724 A2 | 1/2006 |
| WO | 2006008319 A2 | 1/2006 |
| WO | 2006045673 A1 | 5/2006 |
| WO | 2006/063992 A2 | 6/2006 |
| WO | 2006/074829 A1 | 7/2006 |
| WO | 2007/082898 A2 | 7/2007 |

OTHER PUBLICATIONS

International Search Report and Written Opinion, PCT/US 08/62590, mailed Apr. 8, 2009 (#2 of 2 that were mailed).

Marquez et al, "Theoretical Investigations of the Solid Oxide Fuel Cell Anode,"PowerPoint presentation given at 206th ECS Meeting Oct. 3-8, 2004, presented on Oct. 7, 2004.

Marquez et al., "Theoretical Investigations of the Solid Oxide Fuel Cell Anode," Abstract 1982, 206th ECS Meeting Oct. 3-8, 2004, published before meeting.

Marquez et al., "Theoretical Investigations of the Electro-oxidation of Ammonia," PowerPoint presentation given at 206 ECS Meeting Oct. 3-8, 2004, presented on Oct. 7, 2004.

Marquez et al., "Theoretical Investigations of the Electro-oxidation of Ammonia," Abstract 2000, 206th ECS Meeting, Oct. 3-8, 2004, published before meeting.

Marquez et al., "Investigation of the Electro-oxidation of Ethanol on Different Alloys," Abstract 567, 206th ECS Meeting, Oct. 3-8, 2004, published before meeting.

Marrese, "Preparation of Strongly Adherent Platinum Black Coatings," Anal. Chem. vol. 59, pp. 217-218, (1987).

McKee et al., "Improved electrocatalysts for ammonia fuel cell anodes," J. Electrochem. Soc. vol. 116, pp. 562-568, (1969).

Miles, et al., "The Oxygen Evolution Reaction on Platinum, Iridium, Ruthenium and Their Alloys at 80° C. in Acid Solutions," Electrochimica Acta, vol. 23, pp. 521-526, (1978).

Nart, et al, "Reactivity of ethanol on platinum and platinum-rhodium bimetallic electrodes," 225th ACS Nat'l. Meeting, New Orleans, LA, Mar. 23-27, 2003.

Oswin et al., "The anodic oxidation of ammonia at platinum black electrodes in aqueous KOH electrolyte," Canadian J. Chem., vol. 41(7), pp. 1686-1694, (1963).

Patil et al, "Investigation of Electrode kinetics of the Electro-oxidation of Coal Slurries," PowerPoint Presentation given at 206th ECS Meeting Oct. 3-8, 2004, presented on Oct. 7, 2004.

Patil et al., "Electrooxidation of coal slurries on different electorde materials," Abstract 565, 206th ECS Meeting, Oct. 3-8, 2004, published before meeting.

Patil et al., "Electrooxidation of coal slurries on different electorde materials," Journal of Power Sources, vol. 158, pp. 368-377, (2006).

Sasaki et al., "Oxidation and adsorption of ammonia on a platinized platinum electrode," J. Electrochem. Soc., vol. 117, pp. 758-762, (1970).

Sathe et al., "Assessment of coal and graphite electrolysis," PowerPoint presentation given at 206th ECS Meeting Oct. 3-8, 2004, presented on Oct. 6, 2004.

Sathe et al., "Assessment of coal and graphite electrolysis," Abstract 559, 206th ECS Meeting, Oct. 3-8, 2004, published before meeting.

Sathe et al., "Assessment of coal and graphite electrolysis on carbon fiber electrodes," Journal of Power Sources, vol. 161, pp. 513-523 (2006).

Schmidt et al., "Electrochemical reactivity of ethanol on porous Pt and PtRu: oxidation/reduction reactions in 1 M HClO4," J. Phys. Chem., vol. 100, pp. 17901-17908, (1996).

Simons et al., "The performance of direct ammonia fuel cells," J. Electrochem. Soc., vol. 115, pp. 556-561, (1969).

Ureta-Zanartu et al., "Electrocatalytic oxidation of ethylene glycol in 0.5 M H2SO4 and 0.5 M NaOH solutions at a bimetallic deposited electrode," Jour. Electroanalytical Chem., vol. 405, pp. 159-167, (1996).

Vidal-Iglesias et al., "Selective electrocatalysis of ammonia oxidation on Pt(100) sites in alkaline medium," Electrochemistry Communications, vol. 5(1), pp. 22-26, (2003).

Vitse et al., "Electro-oxidation of ammonia for fuel cell application," Abs. 1027, 204th Electrochemical Society Conference Meeting, held in Orlando, Florida, (Oct. 12-16, 2003) published before meeting.

Vitse et al., "Electro-oxidation of Ammonia and its Applications," PowerPoint presentation given at 204th ECS Meeting Oct. 12-16, 2003.

Vitse et al, "Ammonia Electrolysis to Power a Hydrogen Fuel Cell: Case Study of an Integrated System," Abstract 1469, 206th ECS Meeting Oct. 3-8, 2004; published before meeting.

Vitse et al., "Analysis of Electro-kinetics of Ammonia Oxidation in Alkaline Media by Mathematical Modeling," Abstract 2306, 206th ECS Meeting, Oct. 3-8, 2004, published before meeting.

Vitse et al., "On the use of ammonia electrolysis for hydrogen production," Journal of Power Sources, vol. 142, pp. 18-26, (2005).

Vitse et al. "Modeling Lithium Intercalation in a Manganese Dioxide Particle," Absract 383, 204th ECS Meeting, Oct. 12-16, 2003, published before meeting.

Wasmus et al., "DEMS-cyclic voltammetry investigation of the electrochemistry of nitrogen compounds in 0.5 M potassium hydroxide," Electrochim. Acta, vol. 39, pp. 23-31, (1994).

Wynveen, Chapter 12, "Preliminary appraisal of the ammonia fuel cell system," Fuel Cells, Young, Editor, vol. 2, pp. 153-167, (1963).

International Search Report & Written Opinion in Application No. PCT/US04/33552, dated Jan. 19, 2006.

International Preliminary Report on Patentability in Application No. PCT/US04/33552, dated Apr. 20, 2006.

International Search Report & Written Opinion in Application No. PCT/US06/40468, dated Apr. 29, 2008.

International Search Report & Written Opinion in Application No. PCT/US06/17641, dated Jul. 16, 2008.

U.S. Patent and Trademark Office, Office Action in related U.S. Appl. No. 10/962,894, dated Dec. 13, 2006, 12 pp.

U.S. Patent and Trademark Office, Office Action in related U.S. Appl. No. 10/962,894, dated Aug. 16, 2007, 12 pp.

U.S. Patent and Trademark Office, Office Action in related U.S. Appl. No. 10/962,894, dated Mar. 20, 2008, 8 pp.

U.S. Patent and Trademark Office, Office Action in related U.S. Appl. No. 12/335,581, dated Mar. 27, 2009, 9 pp.

Abreu et al., "Characterization of electrooxidized Pittsburgh No. 8 Coal," Fuel, vol. 86, pp. 573-587 (2007).

Abreu et al., "Experimental and theoretical Investigation of the Electrolysis of Ethanol for Fuel Cell Applications," PowerPoint presentation given at 206th ECS Meeting Oct. 3-8, 2004, presented on Oct. 7, 2004.

Adanuvor et al., "Modeling the rotating disk electrode for studying the kinetics of electrochemical reactions," J. Electrochem. Soc., vol. 134, Issue 3, pp. 625-631, (1987).

Andonoglou et al., "Preparation and electrocatalytic activity of rhodium modified pitch-based carbon fiber electrodes," Electrochimica Acta, vol. 44, pp. 1455-1465, (1998).

Bergamaski et al., "Effect of alcohol concentration and electrode composition on the ethanol electrochemical oxidation," Ecletica Quimica, vol. 28, Issue 2, pp. 87-92, (2003).

Bonnin et al., "Feasibility of Electrolyzing Ammonia Effluents for the Production of Hydrogen," PowerPoint presentation given at 206th ECS Meeting Oct. 3-8, 2004, presented on Oct. 4, 2004.

Bonnin et al., "Feasibility of Electrolyzing Ammonia Effluents for the Production of Hydrogen," Abstract 70, 206th ECS Meeting Oct. 3-8, 2004, published before the meeting.

Bonnin et al., "Effect of catalyst on electrolysis of ammonia effluents," Journal of Power Sources, vol. 182, pp. 284-290, (2008).

Botte et al., "Ammonia Electrolysis to Power a Hydrogen Fuel Cell: Case Study of an Integrated System," Power Point presentation given at 206th ECS Meeting Oct. 3-8, 2004, presented on Oct. 6, 2004.

Botte et al., "MRSST a new method to evaluate thermal stability of electrolytes for lithium ion batteries," Journal of Power Sources vol. 119-121, pp. 815-820, (2003).

Botte et al., "Analysis of Electro-kinetics of Ammonia Oxidation in Alkaline Media by Mathematical Modeling," PowerPoint presentation given at 206th ECS Meeting Oct. 3-8, 2004, presented on Oct. 4, 2004.

Botte et al., "Comparison of finite difference and control volume methods for solving differential equations," Computers and Chemical Eng., vol. 24, pp. 2633-2654, (2000).

Botte et al., "Influence of some variables on the thermal behavior of a lithium-ion cell," Journal of Electrochemical Soc., vol. 146, (3), pp. 914-923, (1999).

Botte et al., "Modeling lithium intercalation in a porous carbon electrode," Journal of Electrochemical Soc., vol. 148 (1), pp. A54-A66, (2001).

Botte et al., "New approximate model for nonlinear adsorption and concentraton dependent surface diffusion in a single particle," Adsorption, vol. 5, pp. 373-380, (1999).

Botte et al., "Thermal stability of LiPF6-EC:EMC electrolyte for lithium ion batteries," Journal of Power Sources, vol. 97-98, pp. 570-575, (2001).

Botte, "Modeling volume changes due to lithium intercalation in a carbon fiber," Electrochimica Acta 50, pp. 5647-5658, (2005).

Botte, "Modeling volume changes due to lithium intercalation," Abstract 314, 204th ECS Meeting, Oct. 12-16, 2003, published before meeting.

Cairns et al., "Ammonia-oxygen fuel cell," Nature,vol. 217, pp. 780-781, (1968).

Carrette, et al., "Fuel cells—fundamentals and applications," Fuel Cells, vol. 1, pp. 5-39, (2001).

Choudhary et al., "CO-free fuel processing for fuel cell applications," Catalysis Today, vol. 77 (1-2), pp. 65-78, (2002).

Cooper et al., "Hydrogen Production from the Electro-oxidation of Ammonia Catalyzed by Platinum and Rhodium on Raney Nickel Substrate," J. Electrochem. Soc., vol. 153, pp. A1894-A1901, (2006).

Cooper et al., "Electrocatalysis of the Oxidation of Ammonia by Raney Nickel and Platinum," PowerPoint presentation given at 206th ECS Meeting Oct. 3-8, 2004, presented on Oct. 5, 2004.

Cooper et al., "Electro-oxidation of Ammonia by Raney Nickel and Platinum,"Abstract 517, 206th ECS Meeting Oct. 3-8, 2004, published before meeting.

Cooper et al., "Optimization of the electrodeposition of Raney nickey on titanium substrate," J. Material Science, vol. 4, pp. 5608-5612, (2006).

Despic, et al., "Kinetics of electrochemical oxidation of ammonia in alkaline solution," Electrochim. Acta, vol. 11, No. 8, pp. 997-1005, (1966).

De Souza et al., "Electro-oxidation of ethanol on Pt, Rh, and PtRh electrodes. A study using DEMS and in-situ FTIR techniques," J. Phys. Chem., vol. 106, pp. 9825-9830, (2002).

De Souza et al., "Performance of a co-electrodeposited Pt-Ru electrode for the electro-oxidation of ethanol studied by an in-situ FTIR spectroscopy," J. Electroanal. Chemistry, vol. 420, pp. 17-20, (1997).

De Vooys et al., "The role of adsorbates in electrochemical oxidation of ammonia on noble and transition metal electrodes," J. Electroanal. Chemistry, vol. 506, pp. 127-137, (2001).

Fujiwara et al., "Ethanol oxidation of PtRu electrodes studied by differential electrochemical mass spectrometry," J. Electroanal. Chemistry, vol. 472, pp. 120-125, (1999).

Gerischer et al., "Untersuchungen zur anodischen oxidation von ammoniak an platin-elektroden," J. Electroanal. Chemistry, vol. 25, pp. 421-433, (1970). (English summary at end of article.).

Georgoliois et al., "Pt electrodeposition on PAN-based carbon fibres," J. Electroanal. Chem. vol. 264, pp. 235-245, (1989).

Gonzalez et al., "Electro-oxidation of Ammonia on Carbon Fibers," PowerPoint presentation given at 206th ECS Meeting Oct. 3-8, 2004, presented on Oct. 7, 2004.

Gonzalez et al., "Electro-oxidation of Ammonia on Carbon Fibers," Abstract 566, 206th ECS Meeting, Oct. 3-8, 2004, published before meeting.

Gootzen, et al., "A DEMS and cyclic voltammetry study of NH3 oxidation on platinized platinum," Electrochim. Acta, vol. 43, pp. 1851-1861, (1998).

Gueneau De Mussy, et al., Characterisation and behavior of Ti/TiO2/ noble metal anodes, Electrochimica Acta 48, pp. 1131-1141, (2003).

Hu et al., "Electro-oxidation of ammonia on different Ni alloy electrodes," Abs. 57, 204th Electrochemical Society Conference meeting held in Orlando, Florida, Oct. 12-16, 2003, published before meeting.

Jin et al., "Feasibility of hydrogen production from coal electrolysis at intermediate temperaures," Journal of Power Sources, vol. 171, pp. 826-834, (2007).

Katan et al., "Current efficiencies for the anodic oxidation of ammonia in potassium hydroxide solution," J. Electrochem. Soc., vol. 110(9), pp. 1022-1023, (1963).

Kawase et al., "Effects of NH3 and NOx on the performance of MCFCs," J. Power Sources, vol. 104, pp. 265-271, (2002).

Kim et al., "Electrolytic decomposition of ammonia to nitrogen in a multi-cell-stacked electrolyzer with a self-pH-adjustment function," J. Applied Electrochemistry, vol. 36, pp. 1415-1426, (2006).

Krueter et al., "Electrolysis: the important energy transformer in a world of sustainable energy," International Journal of Hydrogen Energy, vol. 23, No. 8, pp. 661-666, (Aug. 1998).

Lamy-Pitara et al., "Platinum modified by electrochemical deposition of adatoms," Applied Catalysis A, vol. 149, pp. 49-87, (1997).

Liu, et al., "Array membrane electrode assemblies for high throughput screening of direct methanol fuel cell anode catalysts," J. Electroanalytical Chem., vol. 535, pp. 49-55, (2002).

Lopez De Mishima, et al., "Electrochemical oxidation of ammonia in alkaline solutions: its application to an amperometric sensor," Electrochimica Acta, vol. 43, No. 3, pp. 395-404, (1998).

Mahe et al., Surface modification of titanium substrates for the preparation of nobel metal coated anodes, Electrochimica Acta 46, pp. 629-636, (2000).

Marincic et al., "Electro-oxidation of ammonia in waste water," Journal of Applied Electrochemistry, vol. 8, pp. 333-345, (1978).

Marquez et al., "Experimental and theoretical investigation of the electrolysis of ethanol for fuel cell applications," Abs. 993, 204th Electrochemical Society Conference Meeting held in Orlando, Florida Oct. 12-16, 2003, published before meeting.

Marquez et al., "Theoretical Investigations of NIYSZ in the presence of H2S," Electrochemical and Solid State Ltrs, vol. 9 (3), pp. A163-A166, (2006).

U.S. Patent and Trademark Office, Office action in related U.S. Appl. No. 12/114,781, dated Apr. 7, 2011.

U.S. Patent and Trademark Office, Office action in related U.S. Appl. No. 12/114,782, dated Apr. 7, 2011.

U.S. Patent and Trademark Office, Office action in related U.S. Appl. No. 12/090,057, dated Jun. 23, 2011.

Baldwin et al., "Voltammetry and electrolysis of coal slurries and H-coal liquids," Fuel (1981) vol. 60, pp. 739-743.

Bergamaski et al., "Effect of alcohol concentration and electrode composition on the ethanol electrochemical oxidation," Ecletica Quirnica (2003) vol. 28, Issue 2, pp. 87-92.

Botte et al., "Electrolysis of Ohio coal for the production of hydrogen for fuel cell applications"—abstract submitted to Ohio University for subcontract OCRC3-04 D-4.1—quarterly report (year 1) Reporting Period Mar. 1, 2004-May 30, 2004.

Botte et al., "Electrolysis of Ohio coal for the production of hydrogen for fuel cell applications"—abstract submitted to Ohio University for subcontract OCRC3-04 D-4.1—quarterly report (year 1) Reporting Period: Jun. 1, 2004-Sep. 1, 2004.

Botte et al., "Electrolysis of Ohio coal for the production of hydrogen for fuel cell applications"—abstract submitted to Ohio University for subcontract OCRC3-04 D-4.11—quarterly report (year 2) Reporting Period: Dec. 1, 2004-Feb. 28, 2005.

Botte et al., "Electrolysis of Ohio coal for the production of hydrogen for fuel cell applications"—abstract submitted to Ohio University for subcontract OCRC3-04 D4.11—quarterly report (year 2) Reporting Period: Sep. 1, 2004-Dec. 1, 2004.

Botte et al., "Electrolysis of Ohio coal for the production of hydrogen for fuel cell applications"—abstract submitted to Ohio University for subcontract OCRC3-04 D-4.11—quarterly report (year 1)—Reporting Period Sep. 1, 2003-Dec. 1, 2003.

Botte et al., "Electrolysis of Ohio coal for the production of hydrogen for fuel cell applications"—abstract submitted to Ohio University for subcontract OCRC3-04 D-4.11—quarterly report (year 1) Reporting Period: Dec. 1, 2003-Feb. 29, 2004.

Botte et al., "Electrolysis of Ohio coal for the production of hydrogen for fuel cell applications"—abstract submitted to Ohio University for subcontract OCRC3-04 D-4.1—Reporting Period—Annual Report (year 1—Sep. 2004).

Botte et al., "Electrolysis of Ohio coal for the production of hydrogen for fuel cell applications"—Annual Project Report as of Sep. 2004.

Botte et al., "Electrolysis of Ohio coal for the production of hydrogen for fuel cell applications," 30th International Technical Conference on Coal Utilization & Fuel Systems, Apr. 17-21, 2005, Clearwater, Florida. Power Point Presentation.

Botte et al., "Electrolysis of Ohio coal for the production of hydrogen for fuel cell applications," Ohio Coal Development Office, Ohio Air Quality Meeting, Dec. 2, 2004. Power Point Presentation.

Botte, "Ammonia electrolysis to power a hydrogen fuel cell: case study of an integrated system and economics," 206th Electrochemical Society Conference Meeting, Oct. 3-8, 2004, Hawaii. Powerpoint Presentation.

Botte, Electrochemical coal gasification with novel electrodes—submitted to the Edison Materials Technology Center (EMTEC) in response to Hydrogen Program Solicitation Round 2 dated Jan. 12, 2005.

Cairns et al., "Ammonia-oxygen fuel cell," Nature (1968) vol. 217, pp. 780-781.

Carrete et al., "Fuel Cells—Fundamentals and Applications," Fuel Cells (2001) vol. 1, pp. 5-39.

Choudhary et al., "CO-free fuel processing for fuel cell applications," Catalysis Today (2002) vol. 77(1-2), pp. 65-78.

Coughlin, R.W. & Faroque, M., Consideration of electrodes and electrolytes for electrochemical gasification of coal by anodic oxidation, Journal of Applied Electrochemistry, vol. 10, 1908, pp. 729-740, XP-002546896.

De Abreu et al., "Experimental and theoretical investigation of the electrolysis of ethanol for fuel cell applications," 206th Electrochemical Society Conference Meeting, Oct. 3-8, 2004, Hawaii. Powerpoint Presentation.

De et al., "Kinetic studies of the electrochemical treatment of nitrate and nitrite ions on iridium-modified carbon fiber," Chem. Eng. Technol. (2004) vol. 27, No. 1, pp. 56-64.

EMTEC Hydrogen Program 2005 RFP Round 2—Phase 1 Proposal Application Forms—Botte, Gerardine, G., Electrochemical coal gasification with novel electrodes dated Jan. 12, 2005.

European Examination Report issued in Application No. 06 759 267.5-2119, dated May 17, 2011.

Patil et al., "Evaluation of different electrode materials for the electro-oxidation of coal slurries for hydrogen production", Abs. 682, 205th Electrochemical Society Conference Meeting, May 9-13, 2004, (First publicly available Feb. 12, 2004).

Reddington et al., "Combinatorial discovery of and optimization of new electrocatalysts," Combinatorial Chemistry: A Practical Approach (2000), H. Fennin, Ed., Oxford University Press, Oxford, pp. 401-420.

Supplementary European Search Report, EP 06 75 9267, Completed Sep. 23, 2009, mailed Oct. 2, 2009.

U.S. Patent and Trademark Office, Office Action in related U.S. Appl. No. 12/114,782, dated Sep. 21, 2011, 7 pp.

U.S. Patent and Trademark Office, Office Action in related U.S. Appl. No. 12/114,781, dated Sep. 21, 2011, 6 pp.

U.S. Patent and Trademark Office, Office action in related U.S. Appl. No. 12/090,057, dated Jan. 18, 2012.

\* cited by examiner

ID: "ELECTROCHEMICAL CELL FOR OXIDATION OF AMMONIA AND ETHANOL"

ELECTROCHEMICAL CELL FOR OXIDATION OF AMMONIA AND ETHANOL

CROSS-REFERENCE TO RELATED APPLICATIONS

The present application claims priority to the provisional application having application Ser. No. 60/916,222, which was filed on May 4, 2007; and to the provisional application having the application Ser. No. 60/974,766, which was filed on Sep. 24, 2007. The present application is a continuation-in-part of the PCT application PCT/US2006/017641, which was filed on May 8, 2006 and in turn claimed priority to the provisional application having application Ser. No. 60/678,725, which was filed on May 6, 2005; and is a continuation-in-part of the non-provisional application having the application Ser. No. 10/962,894, which was filed on Oct. 12, 2004 and issued on Feb. 3, 2009 as U.S. Pat. No. 7,485,211, and in turn claimed priority to the provisional application having application Ser. No. 60/510,473, which was filed on Oct. 10, 2003, the entirety of which are incorporated herein by reference.

FIELD

The present embodiments relate to an electrochemical cell for causing a reaction that produces hydrogen through the oxidation of ammonia, ethanol, or combinations thereof.

BACKGROUND

A need exists for an electrochemical cell able to oxidize ammonia, ethanol, or combinations thereof in alkaline media continuously.

A further need exists for an electrochemical cell that utilizes an electrode having a unique layered electrocatalyst that overcomes the positioning of the electrode due to surface blockage.

A need also exists for an electrochemical cell that utilizes a layered electrocatalyst with a carbon support that provides a hard rate of performance for the carbon support.

The present embodiments meet these needs.

SUMMARY OF THE INVENTION

According to an embodiment of the invention, an electrochemical cell for causing a reaction that produces hydrogen is provided. The electrochemical cell includes a first electrode; a second electrode comprising a conductor; a basic electrolyte; a member of the group consisting of: ammonia, ethanol, or combinations thereof; and electrical current in communication with the first electrode.

BRIEF DESCRIPTION OF THE DRAWINGS

The detailed description will be better understood in conjunction with the accompanying drawings as follows.

Figure 1:
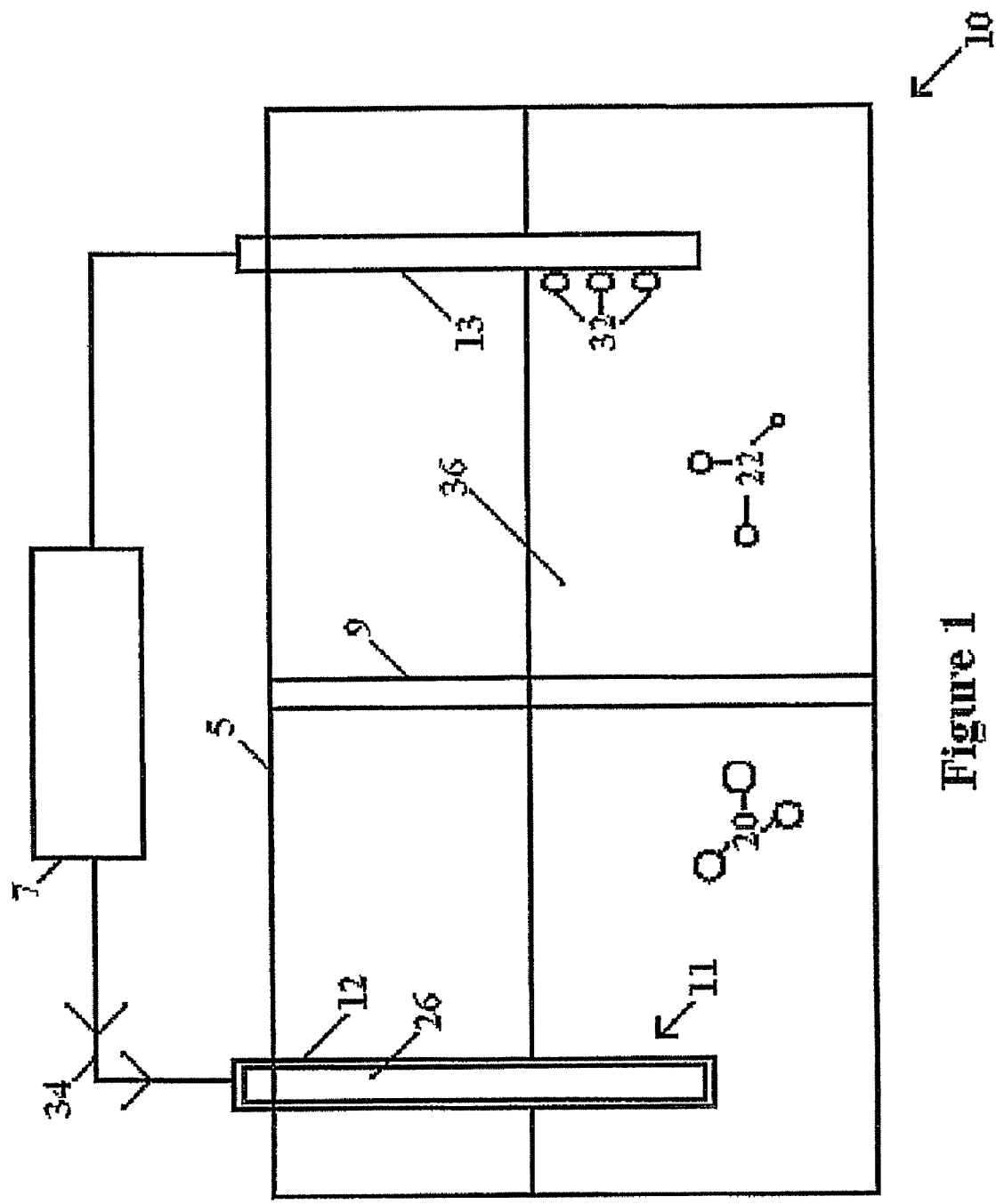
FIG. 1 depicts an embodiment of the present electrochemical cell.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to an electrochemical cell for causing a reaction that produces hydrogen from the oxidation of ammonia, ethanol, or combinations thereof.

Conventional hydrogen production is expensive, energy inefficient, and creates unwanted byproducts.

The present electrochemical cell provides the benefit of continuous, in-situ generation of hydrogen through the oxidation of ammonia, ethanol, or combinations thereof. The present electrochemical cell produces hydrogen through the oxidation of both ammonia and ethanol, with a faradic efficiency of 100%. In both cases, the reaction that takes place at the cathode is the reduction of water in alkaline medium, through the following reaction:

$$2H_2O+2e^- \rightarrow H_2+2OH^- \quad E^0=0.82 \text{ V vs SHE}$$

where SHE is a standard hydrogen electrode.

Hydrogen is the main fuel source for power generation using fuel cells, but the effective storage and transportation of hydrogen presents technical challenges. Current hydrogen production costs cause fuel cell technology for distributed power generation to be economically non-competitive when compared to traditional oil-fueled power systems. Current distributed hydrogen technologies are able to produce hydrogen at costs of $5 to $6 per kg of H2. This high production cost is due in part to high product separation/purification costs and high operating temperatures and pressures required for hydrogen production.

Using current technologies, hydrogen can be obtained by the partial oxidation, catalytic steam reforming, or thermal reforming of alcohols and hydrocarbons. However, all of these processes take place at high temperatures and generate a large amount of $CO_X$ as byproducts, which must be removed from the hydrogen product. Most of these $CO_X$ byproducts cause degeneration of fuel cell performance due to poisoning of the fuel cell catalysts. The removal of these byproducts from the fuel stream is complicated, bulky, and expensive.

Currently, the cleanest way to obtain pure hydrogen is by the electrolysis of water. During the electrolysis of water electrical power (usually provided by solar cells) is used to break the water molecule, producing both pure oxygen and hydrogen. The disadvantage of this process is that a large amount of electrical power is needed to produce hydrogen. The theoretical energy consumption for the oxidation of water is 66 W-h per mole of H^ produced (at 25° C.). Therefore, if solar energy is used (at a cost of $0.2138/kWh), the theoretical cost of hydrogen produced by the electrolysis of water is estimated to be $7 per kg of H2.

The present electrochemical cell overcomes the costs and difficulties associated with the production of hydrogen, by enabling continuous, controllable evolution of hydrogen through the oxidation of plentiful and inexpensive feedstocks that include ammonia and/or ethanol.

Plating of carbon fibers, nano-tubes, and other carbon supports is a difficult task that is problematic due to the relatively low electronic conductivity of these materials. The low conductivity of carbon supports can cause a poor coating of the surface of the support, which can be easily removed. The electronic conductivity of carbon fibers and other carbon supports decreases along the length from the electrical connection. Therefore, the furthest point of contact to the electric connection transfers a low current when compared with the closest point to the electric contact.

The present electrochemical cell advantageously utilizes a unique layered electrocatalyist that provides electrodes with uniform current distribution, enhanced adherence and durability of coating, and overcomes surface coverage affects, leaving a clean active surface area for reaction.

It was believed that the surface blockage caused during the ammonia electrolysis in alkaline medium was due to the presence of elemental Nitrogen, according to the mechanism proposed by Gerisher:

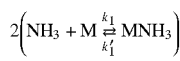

-continued

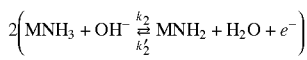

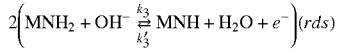

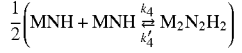

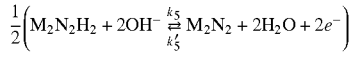

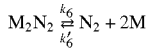

Deactivation Reaction:

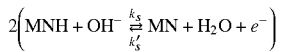

where M represents an active site on the electrode.

The present electrochemical cell incorporates the demonstrations of two independent methods indicating that the proposed mechanism by Gerisher is not correct, and that OH needs to be adsorbed on the electrode for the reactions to take place. Furthermore, the electrode is deactivated by the OH adsorbed at the active sites.

Results from molecular modeling indicate that the adsorption of OH on an active Pt site is strong (chemisorption) and can be represented by the following reaction:

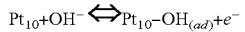

Figure 3:
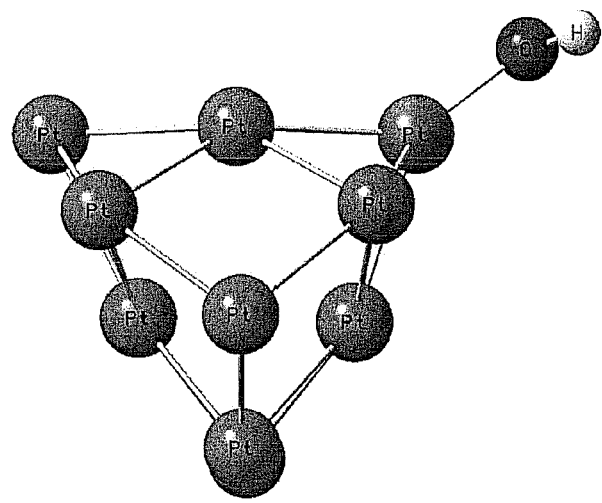
FIG. 3 shows adsorption of OH on a Platinum cluster.

FIG. 3 shows a bond between OH and a platinum cluster. The system was modeled using Density functional Methods. The computations were performed using the B3PW91 and LANL2DZ method and basis set, respectively. The binding energy for the Pt—OH cluster is high with a value of −133.24 Kcal/mol, which confirms the chemisorption of OH on a Pt cluster active site.

Additionally, results from microscopic modeling as well as experimental results on a rotating disk electrode (RDE) indicate that the adsorption of OH is strong and responsible for the deactivation of the catalyst.

Figure 4:
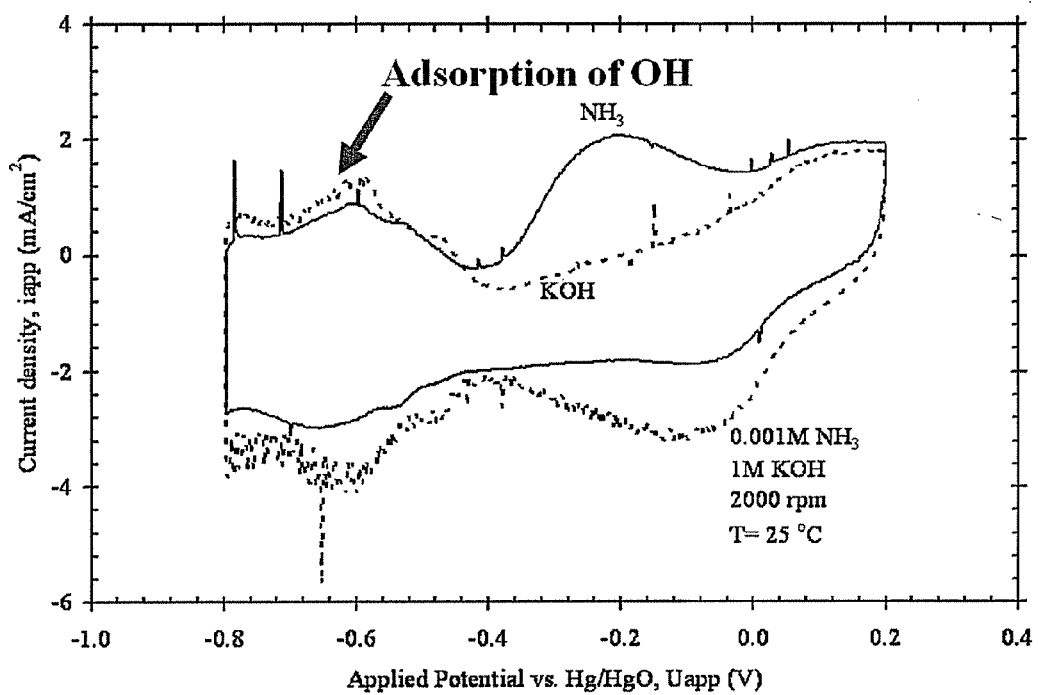
FIG. 4 shows experimental results of the electro-oxidation of ammonia on a Pt electrode, using a rotating disk electrode.

FIG. 4 compares the baseline of a KOH solution with the same solution in the presence of OH. The curves indicate that the first oxidation peaks that appear at about −0.7 V vs Hg/HgO electrode were due to the electro-adsorption of OH.

Figure 5:
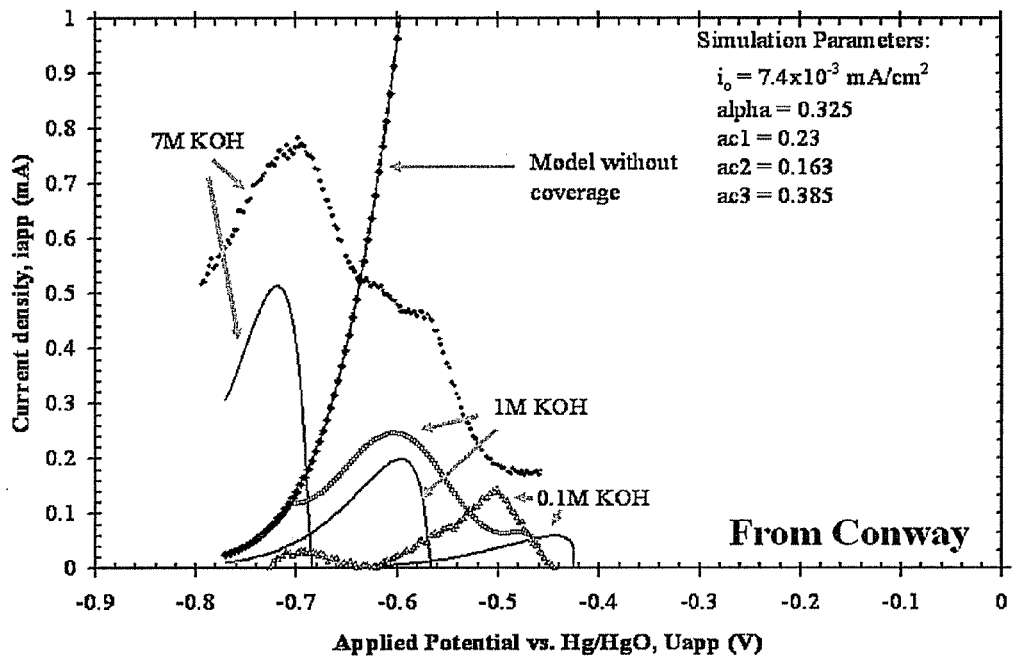
FIG. 5 shows results of microscopic modeling of the electro-adsorption of OH, indicating that if the sites were available, the adsorption of OH would continue producing higher oxidation currents

FIG. 5 shows a comparison of the predicted results (by microscopic modeling) with the experimental results for the electro-adsorption of OH. The results indicate that the model predicts the experimental results fairly well. Furthermore, an expression for the surface blockage due to the adsorption of OH at the surface of the electrode was developed (notice that the active sites for reaction theta decay with the applied potential due to adsorbates). If the surface were clean (see results model without coverage), the electro-adsorption of OH would continue even at higher potentials, and would occur more rapidly.

Compiling the experimental results with the modeling results, the following mechanism for the electro-oxidation of ammonia in alkaline medium is proposed: First the adsorption of OH takes place. As the ammonia molecule approaches the electrode, it is also adsorbed on the surface. Through the oxidation of ammonia, some OH adsorbates are released from the surface in the form of water molecules. However, since the adsorption of OH is stronger, and the OH ions move faster to the surface of the electrode, they are deactivated, increasing potential. There will be a competition on the electrode between the adsorption of OH and NH3.

Figure 6:
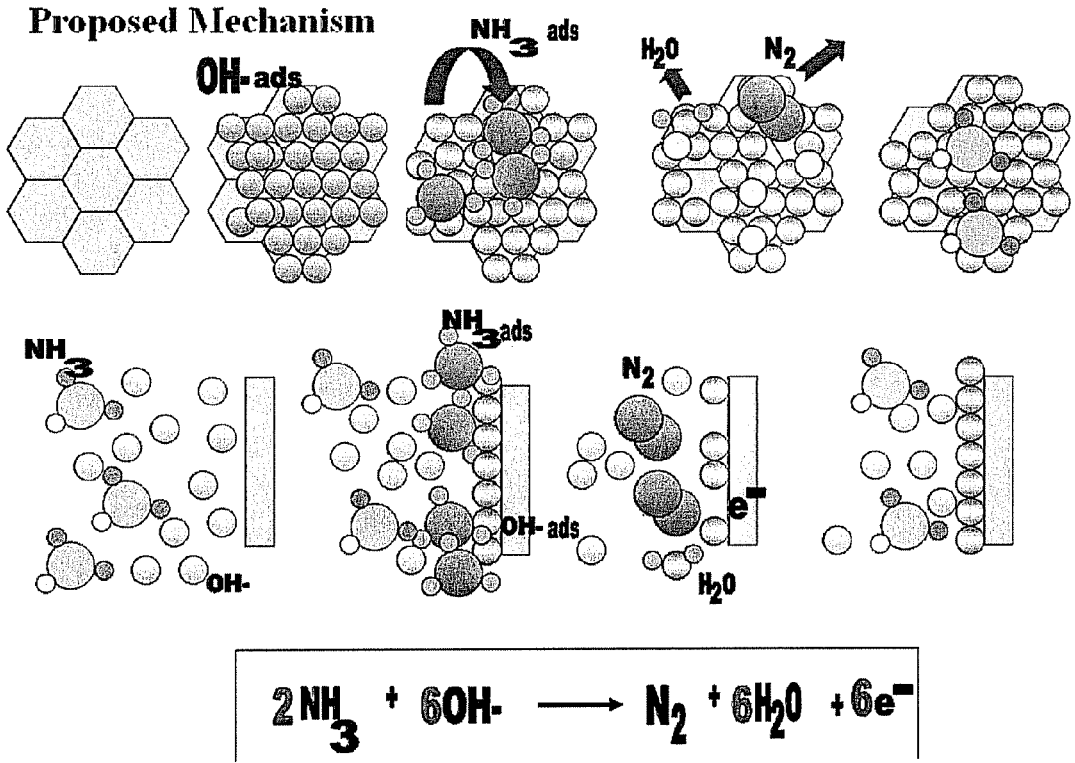
FIG. 6 shows a representation of the electro-oxidation mechanism of ammonia on a Pt electrode. As NH3 reaches the Pt surface it competes with the OH" electro-adsorption. Since the Electro-adsorption of OH" is faster on Pt the active sites of the electrode get saturated with the OH adsorbates causing deactivation of the electrode.

The results of the mechanism are summarized by the proposed reactions given below, as well as FIG. 6.

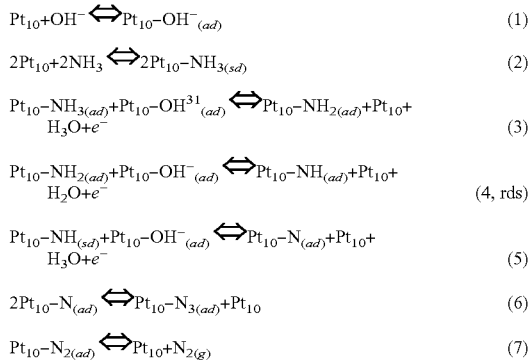

$$Pt_{10} + OH^- \Leftrightarrow Pt_{10}\text{-}OH^-_{(ad)} \quad (1)$$

$$2Pt_{10} + 2NH_3 \Leftrightarrow 2Pt_{10}\text{-}NH_{3(sd)} \quad (2)$$

$$Pt_{10}\text{-}NH_{3(ad)} + Pt_{10}\text{-}OH^{31}{}_{(ad)} \Leftrightarrow Pt_{10}\text{-}NH_{2(ad)} + Pt_{10} + H_3O + e^- \quad (3)$$

$$Pt_{10}\text{-}NH_{2(ad)} + Pt_{10}\text{-}OH^-_{(ad)} \Leftrightarrow Pt_{10}\text{-}NH_{(ad)} + Pt_{10} + H_2O + e^- \quad (4, rds)$$

$$Pt_{10}\text{-}NH_{(sd)} + Pt_{10}\text{-}OH^-_{(ad)} \Leftrightarrow Pt_{10}\text{-}N_{(ad)} + Pt_{10} + H_3O + e^- \quad (5)$$

$$2Pt_{10}\text{-}N_{(ad)} \Leftrightarrow Pt_{10}\text{-}N_{3(ad)} + Pt_{10} \quad (6)$$

$$Pt_{10}\text{-}N_{2(ad)} \Leftrightarrow Pt_{10} + N_{2(g)} \quad (7)$$

This mechanism can be extended to the electro-oxidation of other chemicals in alkaline solution at low potentials (negative vs. standard hydrogen electrode (SHE)). For example, the mechanism has been extended to the electro-oxidation of ethanol. The proposed mechanism clearly defines the expectations for the design of better electrodes: the materials used should enhance the adsorption of NH3 and/or ethanol, or other chemicals of interest. The proposed mechanism can also enhance the electrolysis of water in alkaline medium. Through a combination of at least two materials, one material more likely to be adsorbed by OH than the other, active sites are left available for the electro-oxidation of the interested chemicals, such as $NH_3$ and/or ethanol.

Significant current densities can be obtained from the oxidation of ammonia on active metals, but such electrodes are far less reversible than those of the present electrochemical cell. Similar cases occur with the electro-oxidation of ethanol in alkaline medium. Furthermore, the activation of the electrodes is limited by surface coverage. The present electrochemical cell overcomes the problems of reversibility as well as deactivation.

The present electrochemical cell includes a first electrode formed from a layered electrocatalyst.

The layered electrocatalyst includes at least one active metal layer deposited on a carbon support. In an embodiment, the layered electrocatalyst can further include at least one second metal layer deposited on the carbon support. The carbon support can be integrated with a conductive metal, such as titanium, tungsten, nickel, stainless steel, or other similar conductive metals.

It is contemplated that the conductive metal integrated with the carbon support can have an inability or reduced ability to bind with metal plating layers used to form the layered electrocatalyst.

The active metal layer is contemplated to have a strong affinity for the oxidation of ammonia, ethanol, or combinations thereof. The second metal layer is contemplated to have a strong affinity for hydroxide. The affinities of the layers enhance the electronic conductivity of the carbon support.

In a contemplated embodiment, the second metal layer can be a second layer of an active metal, such that the layered electrocatalyst includes two active metal layers deposited on the carbon support.

The carbon support can include carbon fibers, carbon tubes, carbon microtubes, carbon microspheres, carbon sheets, carbon nanotubes, carbon nanofibers, or combinations thereof. For example, groups of carbon nanofibers bound in clusters of 6,000, wound on titanium, nickel, carbon steel, or other similar metals, could be used as a carbon support.

Carbon fibers can include woven or non-woven carbon fibers, that are polymeric or other types of fibers. For example, a bundle of polyacrylonitrile carbon fibers could be used as a carbon support. Solid or hollow nano-sized carbon fibers, having a diameter less than 200 nanometers, can also be useable. Bundles of 6000 or more carbon fibers are contemplated, having an overall diameter up to or exceeding 7 micrometers.

Carbon microspheres can include nano-sized Buckyball supports, such as free standing spheres of carbon atoms having plating on the inside or outside, having a diameter less than 200 nanometers. Crushed and/or graded microspheres created from the grinding or milling of carbon, such as Vulcan 52, are also useable.

Carbon sheets can include carbon paper, such as that made by Toray™, having a thickness of 200 nanometers or less. Useable carbon sheets can be continuous, perforated, or partially perforated. The perforations can have diameters ranging from 1 to 50 nanometers.

Carbon tubes can include any type of carbon tube, such as nano-CAPP or nano-CPT, carbon tubes made by Pyrograf®, or other similar carbon tubes. For example, carbon tubes having a diameter ranging from 100 to 200 nanometers and a length ranging from 3,000 to 100,000 nanometers could be used.

The metal layers can be deposited on the carbon support through sputtering, electroplating, such as through use of a hydrochloric acid bath, vacuum electrodeposition, other similar methods, or combinations thereof.

The active metal layer can include rhodium, rubidium, iridium, rhenium, platinum, palladium, copper, silver, gold, nickel, iron, or combinations thereof.

The second metal layer can include platinum, iridium, or combinations thereof. The ratio of platinum to iridium can range from 99.99:0.01 to 50:50. In an embodiment, the ratio of platinum can range from 95:5 to 70:30. In other embodiments, the ratio of platinum to iridium can range from 80:20 to 75:25.

Each layer can be deposited on the carbon support in a thickness ranging from 10 nanometers to 10 microns. For example, a loading of at least 2 mg/cm for each layer can be provided to a carbon fiber support, while both layers can provide a total loading ranging from 4 mg/cm to 10 mg/cm.

Each layer can wholly or partially cover the carbon support. Each layer can be perforated. Each layer can have regions of varying thickness.

It is contemplated that the thickness and coverage of each layer can be varied to accommodate the oxidation of a specified feedstock. For example, a feedstock having a 1M concentration of ammonia could be oxidized by an electrode having a layer that is 0.5 microns in thickness at a rate of 100 mA/cm^2.

The present electrochemical cell can thereby be customized to meet the needs of users. For example, a first user may need to generate hydrogen for fuel from the rapid oxidation of ethanol, while a second user may need to remove ammonia from a fixed volume of water for purification purposes.

The strong activity of ammonia and/or ethanol of the electrocatalyst used in the present electrochemical cell, even with low ammonia concentrations, is useful in processes for removing ammonia from contaminated effluents. Accordingly, the electrocatalysts described herein can be used to oxidize the ammonia contamination in the contaminated effluent. An electrolytic cell may be prepared which uses at least one electrode comprising the layered electrocatalyst described herein to oxidize ammonia contaminants in effluents. The effluent may be fed as a continuous stream, wherein the ammonia is electrochemically removed from the effluent, and the purified effluent is released or stored for other uses.

The present electrochemical cell also includes a second electrode that includes a conductor. The second electrode can include carbon, platinum, rhenium, palladium, nickel, Raney Nickel, iridium, vanadium, cobalt, iron, ruthenium, molybdenum, other similar conductors, or combinations thereof.

Figure 7:
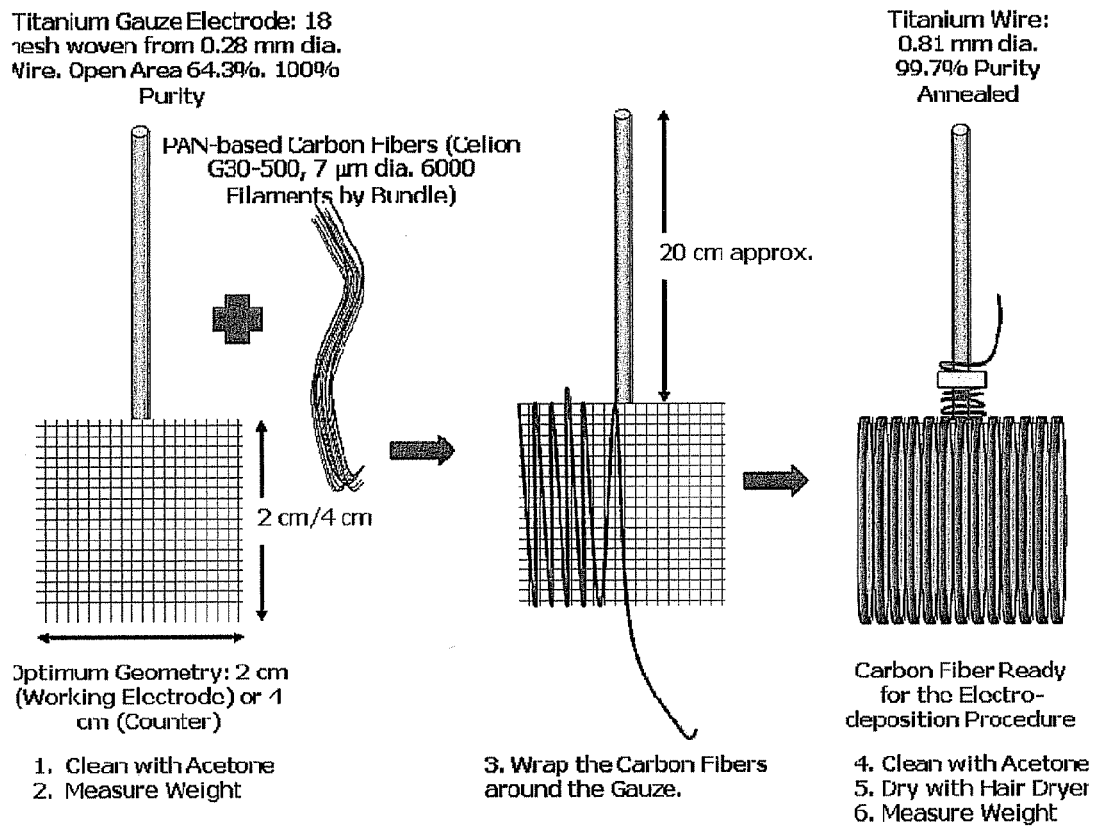
FIG. 7 shows shows a schematic representation of the procedure used to increase the electronic conductivity of the carbon fibers during plating and operation.

FIG. 7 shows a schematic representation of the procedure used to increase the electronic conductivity of the carbon fibers during plating (and also during the operation of the electrode). The fibers were wrapped on a titanium gauze, and were therefore in electric contact with the metal at different points. This improvement allowed easy and homogenous plating of the fibers at any point. The electronic conductivity at any point in the fiber was the same as the electronic conductivity of the Ti gauze.

Figure 8:
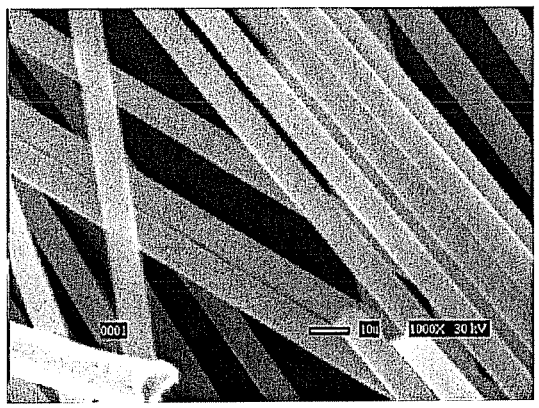
FIG. 8 shows SEM photographs of the carbon fibers before plating and after plating.
Figure 8:
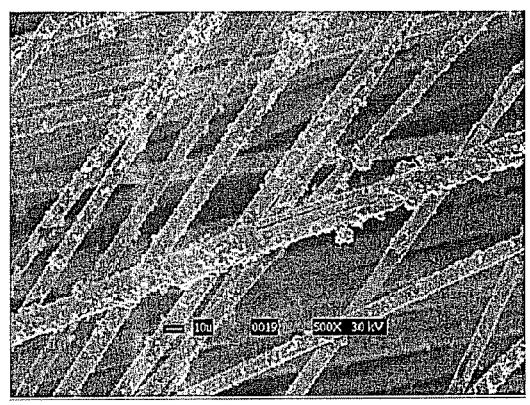

FIG. 8 shows a Scanning Electron Microscope photograph of the electrode before plating and after plating. A first layer of Rh was deposited on the electrode to increase the electronic conductivity of the fibers and to serve as a free substrate for the adsorption of OH. (OH has more affinity for Rh than for Pt). A second layer consisting of Pt was plated on the electrode. The Pt layer did not cover all the Rh sites, leaving the Rh surface to act as a preferred OH adsorbent.

Figure 9:
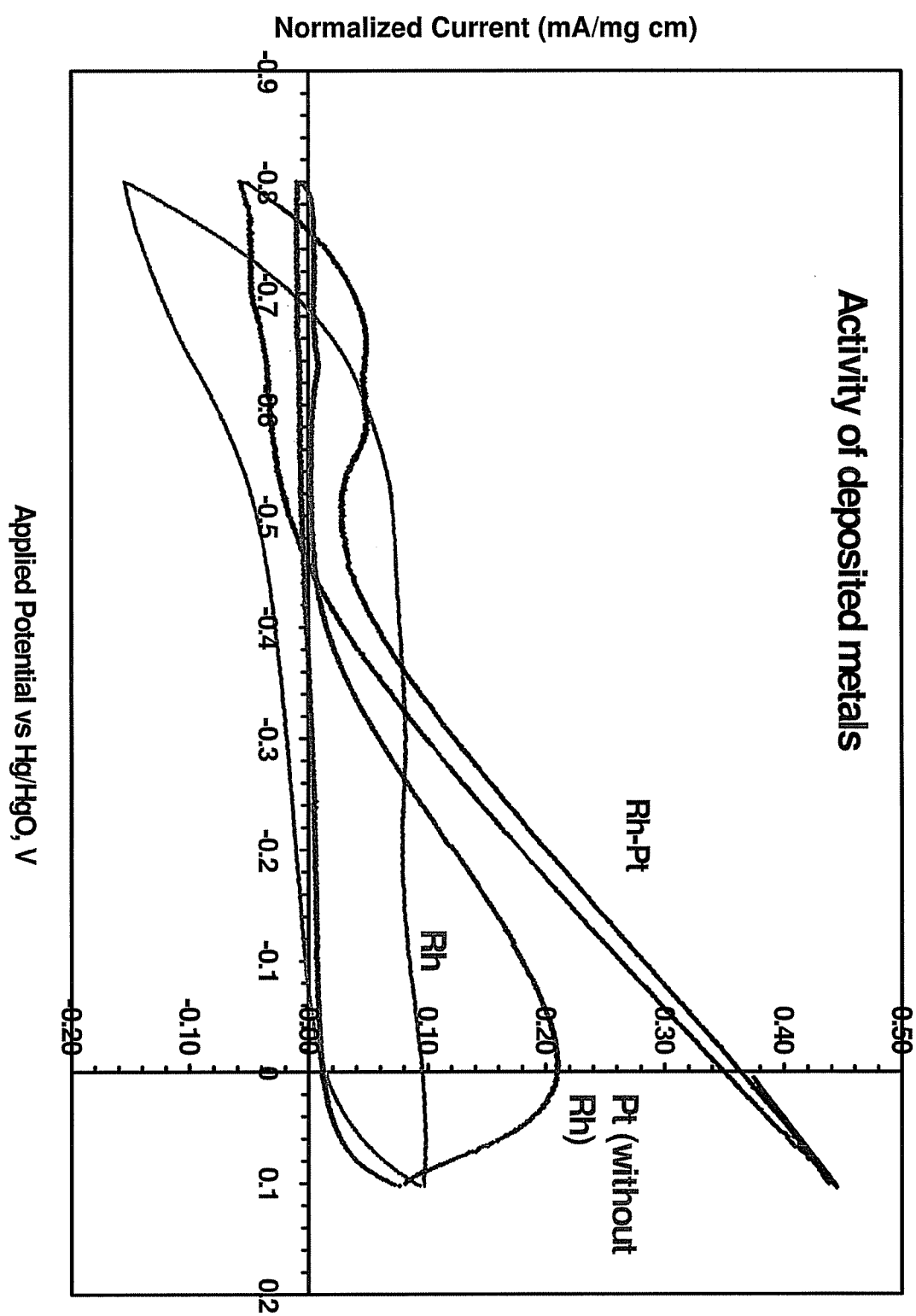
FIG. 9 shows cyclic voltammetry performance of 1M Ammonia and 1M KOH solution at 25° C., comparing the performance of the carbon fiber electrodes with different compositions.

FIG. 9 shows the cyclic voltammetry performance for the electro-oxidation of ammonia on different electrode compositions. Notice that the carbon fibers plated with only Rh are not active for the reaction, while when they are plated with only Pt, the electrode is active but it is victim of poisoning. On the other hand, when the electrode is made by plating in layers: first Rh is deposited and then a second layer consisting of Pt is deposited, the electrode keeps the activity. This is explained by the mechanism presented previously. FIG. 9 demonstrates that the proposed method or preparation of the electrode eliminates surface blockage difficulties.

Figure 10:
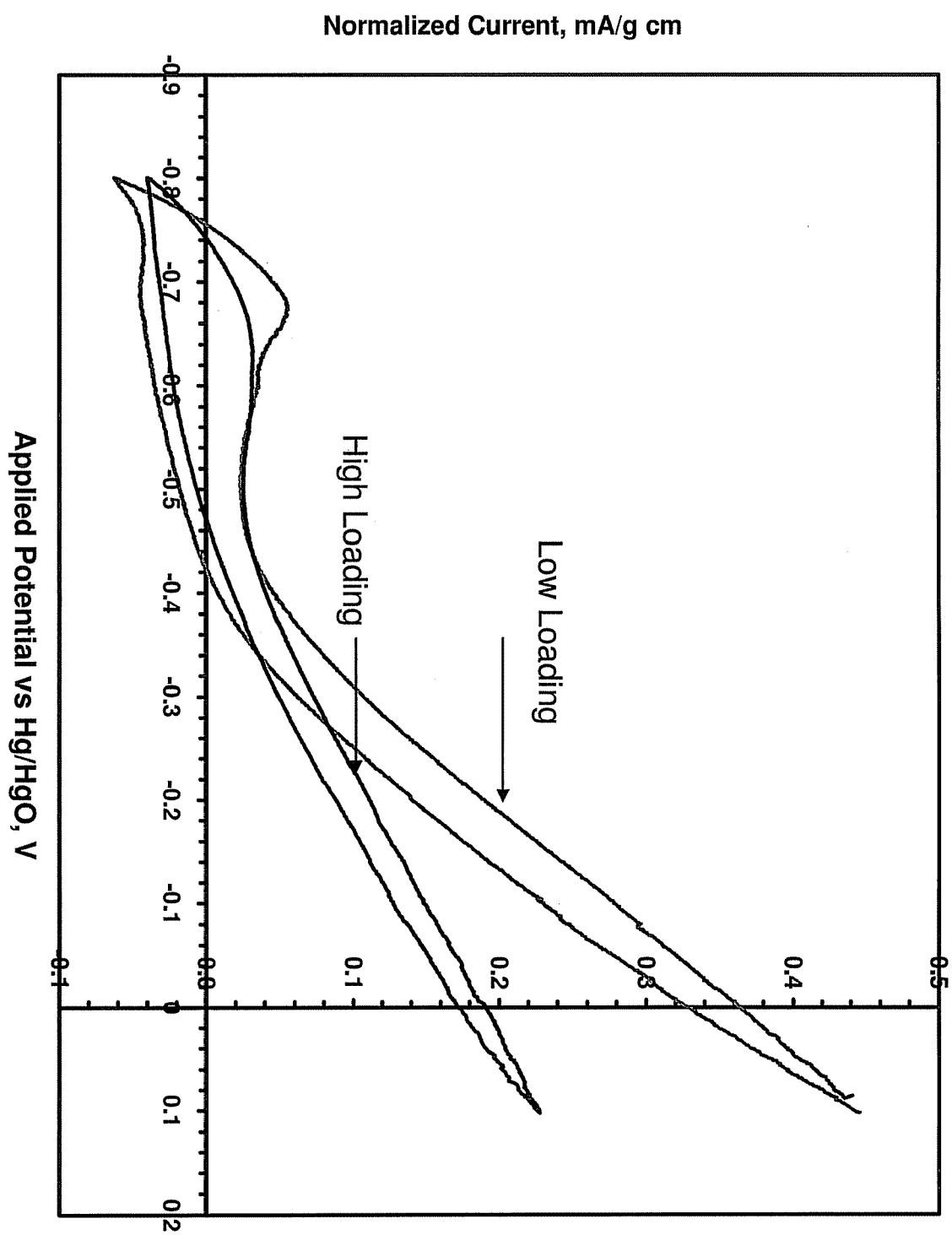
FIG. 10 shows cyclic voltammetry performance of 1M Ammonia and 1M KOH solution at 25° C., comparing the loading of the electrode, with low loading 5 mg of total metal/cm of carbon fiber and high loading 10 mg of metal/cm of carbon fiber.

FIG. 10 shows the effect of different total loading on the electro-oxidation of ammonia. The results indicate that the catalyst with the lowest loading is more efficient for the electro-oxidation of ammonia. This feature results in a more economical process owing to a lower expense related to the catalyst. Additional loading of the catalyst just causes the formation of layers over layers that do not take part in the reaction.

Figure 11:
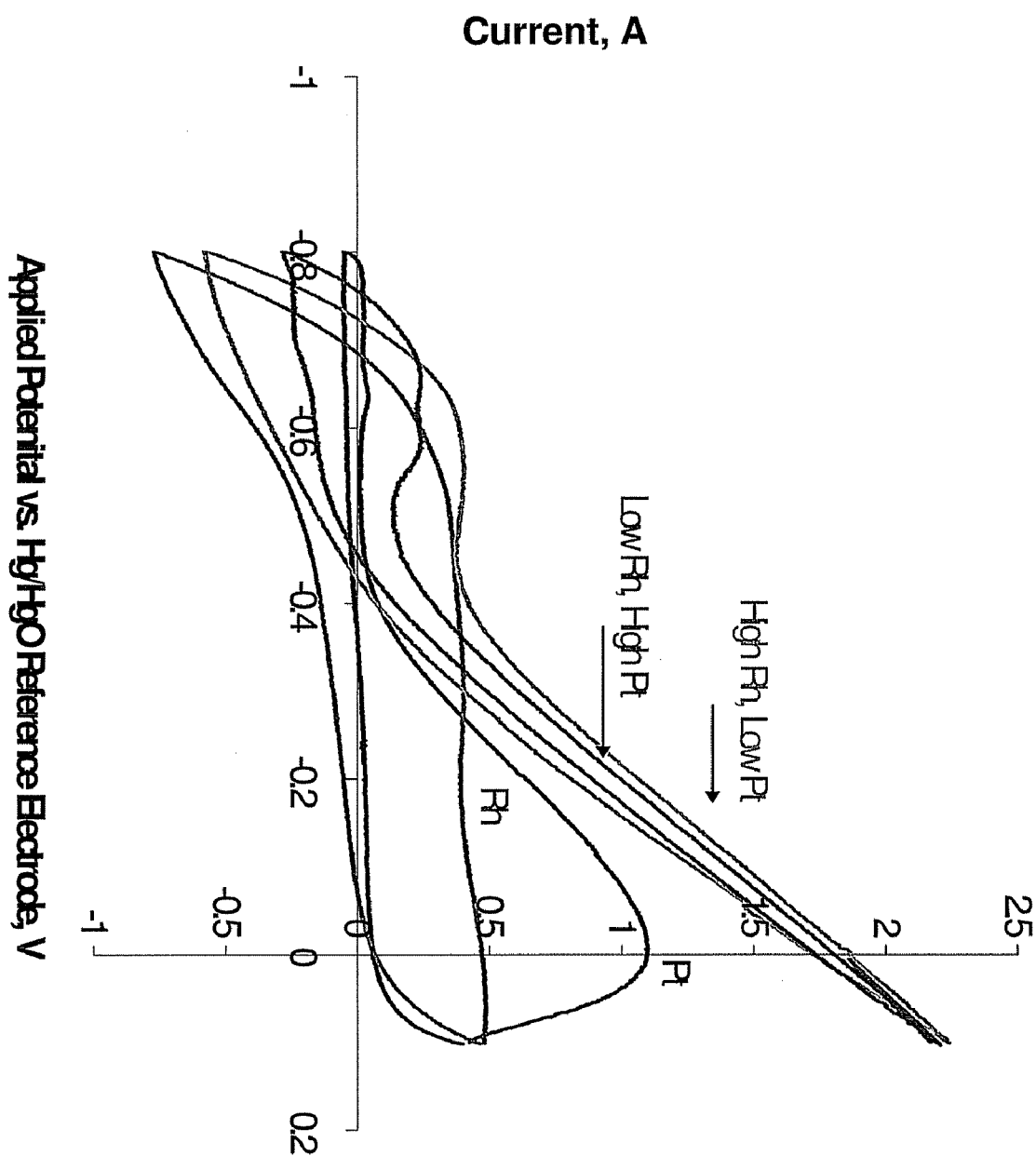
FIG. 11 shows cyclic voltammetry performance of 1M Ammonia and 1M KOH solution at 25° C., comparing differing electrode compositions at low loading of 5 mg of total metal/cm of fiber. Electrode compositions include High Rh, Low Pt (80% Rh, 20% Pt), and low Rh and high Pt (20% Rh, 80% Pt).

FIG. 11 illustrates the effect of the catalyst composition of the electro-oxidation of ammonia in alkaline solution. There is not a notable difference in the performance of the electrode due to the composition of the electrode. This lack of difference is due to the fact that as long as a first layer of Rh is plated on the electrode, surface blockage will be avoided. Additional plating of Pt would cause the growth of a Pt island (see SEM picture, FIG. 8), which is not completely active in the whole surface.

Figure 12:
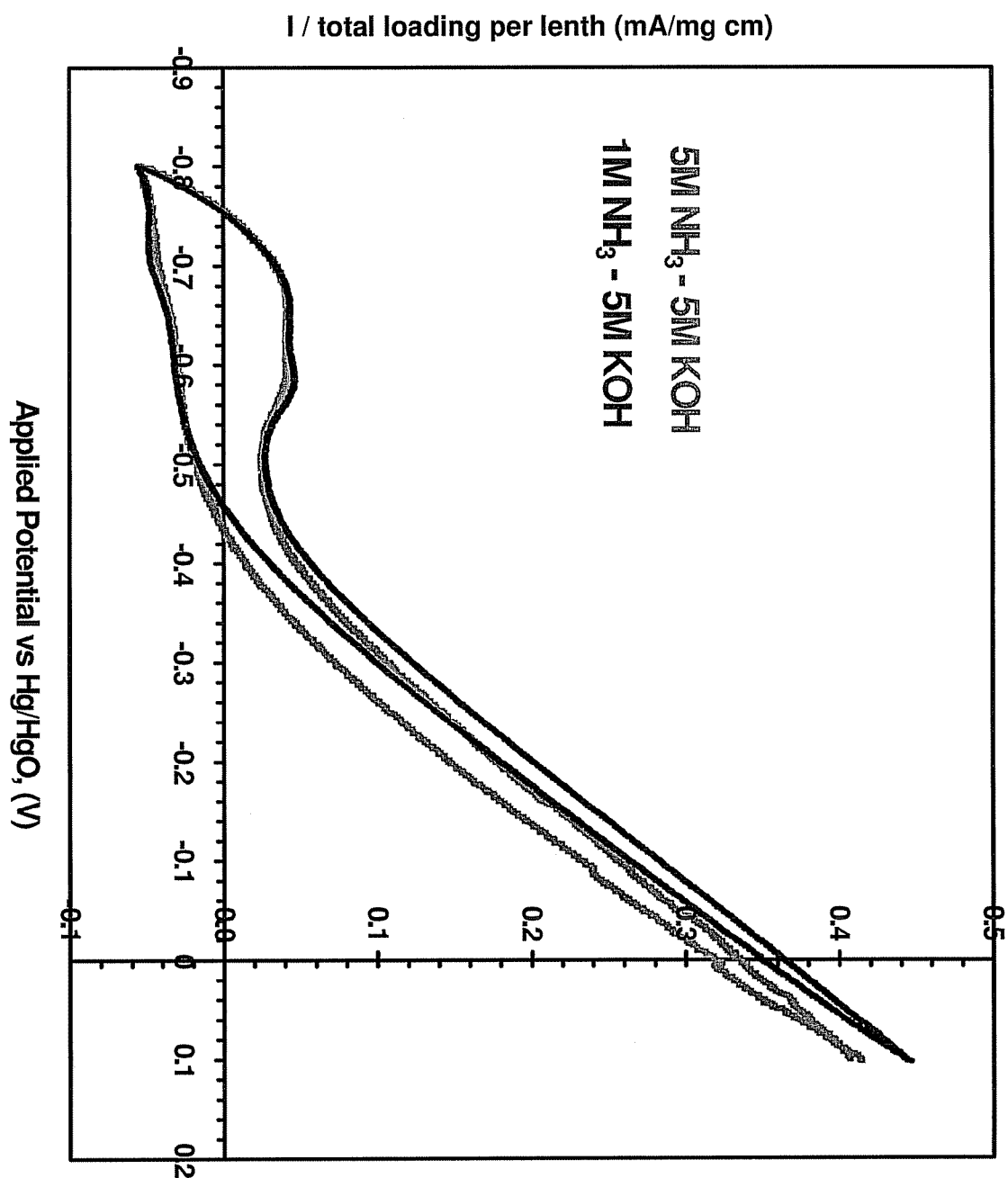
FIG. 12 shows cyclic voltammetry performance of 1M Ammonia and 1M KOH solution at 25° C., with differing ammonia concentration, indicating that the concentration of NH3 does not affect the kinetics of the electrode.

FIG. 12 shows the effect of ammonia concentration on the performance of the electrode. The effect of ammonia concentration is negligible on the electrode performance. This is due to the fact that the active Pt sites have already adsorbed the NH3 needed for a continuous reaction. Due to this feature, the present electrochemical cell is operable using only trace amounts of ammonia and/or ethanol.

Figure 13:
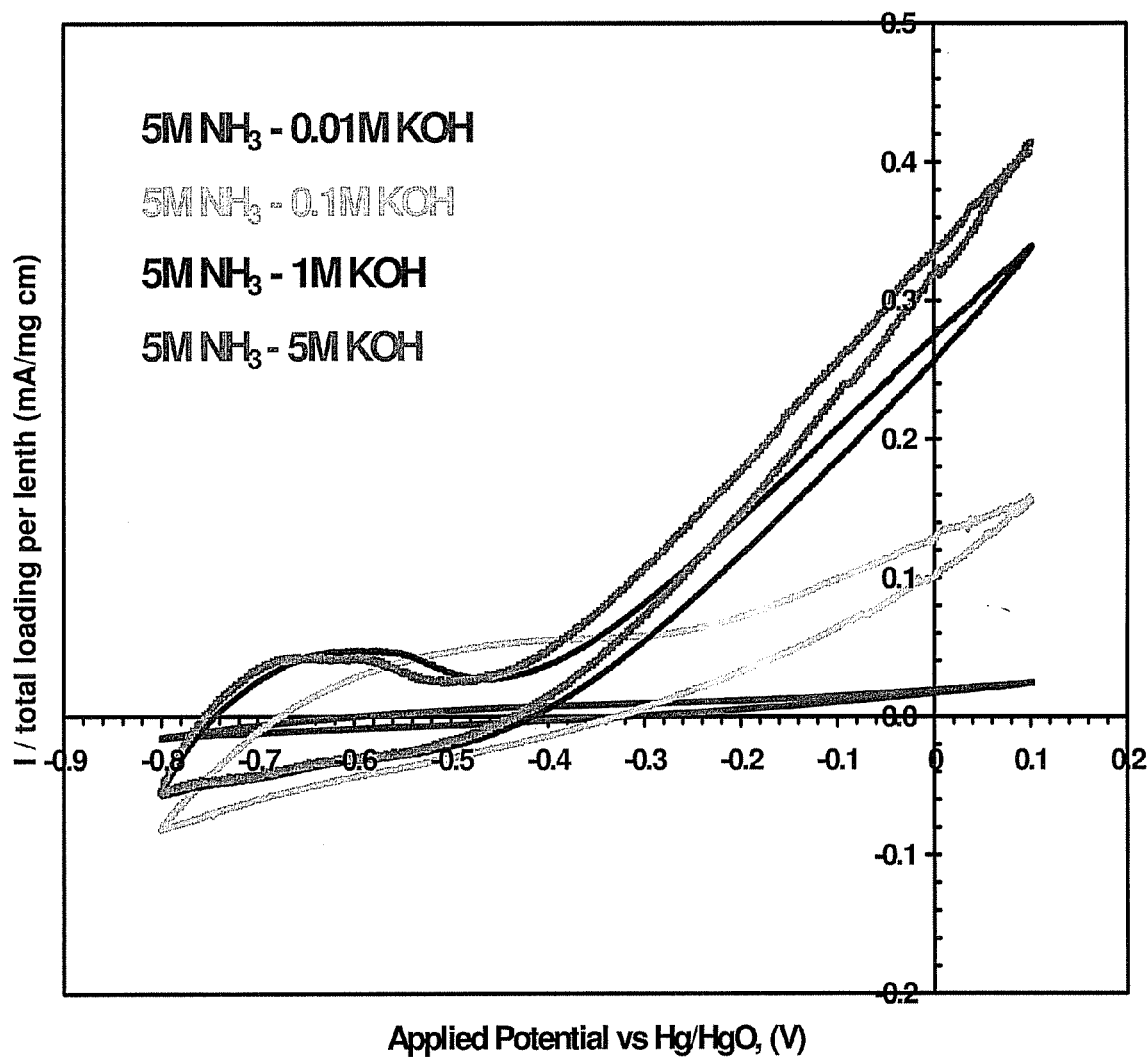
FIG. 13 shows cyclic voltammetry performance of Effect of solution at 25° C., with differing OH concentration, indicating that a higher the concentration of OH causes faster kinetics.

FIG. 13 depicts the effect of the concentration of OH on the electro-oxidation of ammonia. A larger concentration of OH causes a faster rate of reaction. The electrode maintains continuous activity, without poisoning, independent of the OH concentration.

Figure 14:
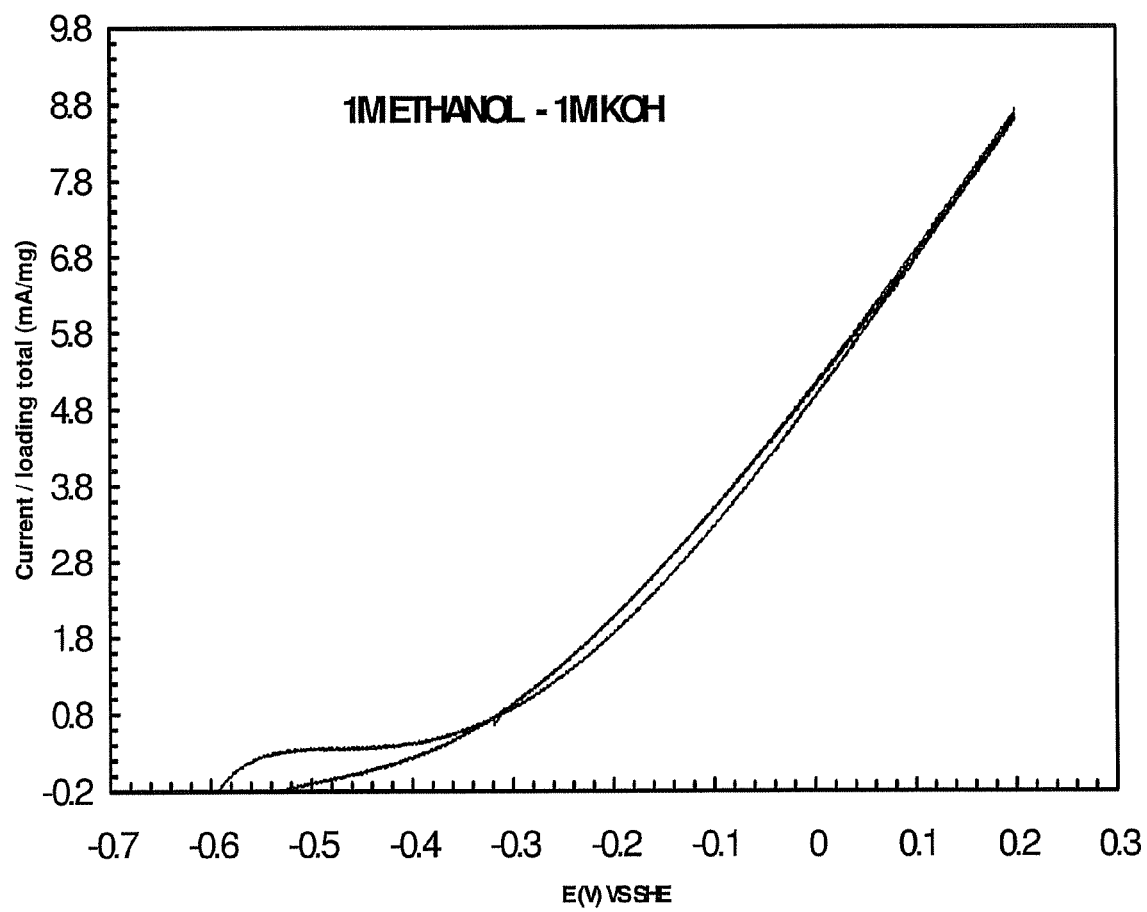
FIG. 14 shows cyclic voltammetry performance of 1M ethanol and 1M KOH solution at 25° C., indicating that the present electrochemical cell is also useable for the continuous oxidation of ethanol.

FIG. 14 shows the evaluation of the electrode for the electro-oxidation of ethanol. Continuous electro-oxidation of ethanol in alkaline medium is achieved without surface blockage. The present electrochemical cell is thereby useable to oxidize ethanol, as well as ammonia. The present electrochemical cell can further oxidize combinations of ammonia and ethanol independently or simultaneously.

In an embodiment, the second electrode and first electrode can both include a layered electrocatalyst.

The second electrode is contemplated to have an activity toward the evolution of hydrogen in alkaline media.

The first electrode, second electrode, or combinations thereof, can include rotating disc electrodes, rotating ring electrodes, cylinder electrodes, spinning electrodes, ultrasound vibration electrodes, other similar types of electrodes, or combinations thereof.

The electrochemical cell further includes a basic electrolyte disposed in contact with each of the electrodes. The basic electrolyte can include any alkaline electrolyte that is compatible with the layered electrocatalyst, does not react with ammonia or ethanol, and has a high conductivity.

The basic electrolyte can include any hydroxide donor, such as inorganic hydroxides, alkaline metal hydroxides, or alkaline earth metal hydroxides. In an embodiment the basic electrolyte can include potassium hydroxide, sodium hydroxide, or combinations thereof.

The basic electrolyte can have a concentration ranging from 0.1 M to 7M. In an embodiment, the basic electrolyte can have a concentration ranging from 3M to 7M. It is contemplated that the basic electrolyte can be present in a volume and/or concentration that exceeds the stoichiometric proportions of the oxidation reaction, such as two to five times greater than the concentration of ammonia, ethanol, or combinations thereof. In an embodiment, the basic electrolyte can have a concentration three times greater than the amount of ammonia and/or ethanol.

The electrochemical cell can include ammonia, ethanol, or combinations thereof, which can be supplied as a fuel/feedstock for oxidation to produce hydrogen.

The present electrochemical cell can advantageously oxidize any combination of ammonia or ethanol, independently or simultaneously. A feedstock containing either ammonia, ethanol, or both ammonia and ethanol could be thereby be oxidized using the present electrochemical cell. Additionally, separate feedstocks containing ammonia and ethanol could be individually or simultaneously oxidized using the electrochemical cell.

The ammonia, ethanol, or combinations thereof can be present in extremely small quantities, millimolar concentrations, and/or ppm concentrations, while still enabling the present electrochemical cell to be useable.

The ammonia and/or ethanol can be aqueous, having water, the basic electrolyte, or another liquid as a carrier. For example, ammonium hydroxide can be stored until ready for use, then fed directly into the electrochemical cell.

It is also contemplated that ammonia can be stored as liquefied gas, at a high pressure, then combined with water and the basic electrolyte when ready for use. Ammonia could also be obtained from ammonium salts, such as ammonium sulfate, dissolved in the basic electrolyte.

In an embodiment, the ammonia, ethanol, or combinations thereof can have a concentration ranging from 0.01 M to 5M. In other embodiments, the concentration of ammonia, ethanol, or combinations thereof, can range from 1M to 2M. At higher temperatures, a greater concentration of ammonia can be used.

The properties of the present electrochemical cell, such as the thickness of the plating of the first electrode, can be varied to accommodate the concentration of the feedstock.

The ability of the present electrochemical cell to perform oxidation of extremely small quantities, millimolar concentrations, and/or ppm concentrations of ammonia and/or ethanol enables the electrochemical cell to advantageously be used as a detector/sensor for ammonia and/or ethanol.

The ability of the present electrochemical cell to perform oxidation of both extremely small and large concentrations of ammonia and/or ethanol enables the electrochemical cell to advantageously accommodate a large variety of feedstocks.

The oxidation of ammonia and/or ethanol by the present electrochemical cell is endothermic. As a result, the electrochemical cell can be used to cool other adjacent or attached devices and equipment, such as a charging battery. Additionally, the heat from the adjacent devices and/or equipment can facilitate the efficiency of the reaction of the electrochemical cell, creating a beneficial, synergistic effect.

Electrical current is supplied to the electrochemical cell, in communication with the first electrode. The electrical current can be alternating current, direct current, or combinations thereof. The amount of electrical current applied to the first electrode can vary depending on the properties of the cell and/or feedstock, based on the Faraday equation.

Contemplated current densities can range from 25 mA/cm^2 to 500 mA/cm^2. In other embodiments, the current densities can range from 50 mA/cm^2 to 100 mA/cm^2. In still other embodiments, the current densities can range from 25 mA/cm^2 to 50 mA/cm^2. Current densities can also range from 50 mA/cm^2 to 500 mA/cm^2, from 100 mA/cm^2 to 400 mA/cm^2, or from 200 mA/cm^2 to 300 mA/cm^2.

The electrical current can be provided from a power generation system, specifically designed to oxidize ammonia and/or ethanol. The power generation system is contemplated to be adjustable to large current, while providing power of one volt or less. Power sources can also include solar panels, alternate or direct current sources, wind power sources, fuel cells, batteries, other similar power sources, or combinations thereof.

When electrical current is supplied to the present electrochemical cell, it is contemplated that the electrochemical cell can produce hydrogen, nitrogen, carbon dioxide, or combinations thereof. A controlled ammonia feedstock reacts, in the alkaline medium, in combination with the controlled voltage and current, to produce nitrogen and hydrogen. A controlled ethanol feedstock reacts similarly, to produce carbon dioxide and hydrogen.

The present electrochemical cell is contemplated to be operable at temperatures ranging from −50 degrees Centigrade to 200 degrees Centigrade. In an embodiment, the cell can be operable from 20 degrees Centigrade to 70 degrees Centigrade. In another embodiment, the cell is operable from 60 degrees Centigrade to 70 degrees Centigrade.

The cell can also be operable from 20 degrees Centigrade to 60 degrees Centigrade, from 30 degrees Centigrade to 70 degrees Centigrade, from 30 degrees Centigrade to 60 degrees Centigrade, or from 40 degrees Centigrade to 50 degrees Centigrade.

It is contemplated that in an embodiment, a higher pressure can be used, enabling the present electrochemical cell to be operable at higher temperatures.

The present electrochemical cell is contemplated to be useable at pressures ranging from less than 1 atm to 10 atm.

In an embodiment, the present electrochemical cell can include a hydrophilic membrane. The hydrophilic membrane can include polypropylene, Teflon™ or other polyamides, other hydrophilic polymers, or combinations thereof. It is contemplated that the hydrophilic membrane can selectively permit the exchange of hydroxide.

In another embodiment, the present electrochemical cell can include a separator. The separator can include polypropylene, glassy carbon, other similar materials, or combinations thereof.

A prototype electrochemical cell for the continuous electrolysis of ammonia and/or ethanol in alkaline medium produced $H_2$ continuously, with a faradic efficiency of 100%. The design of the cell was small (4×4 cm), and permitted a significant production of $H_2$ at a small energy and power consumption. A cloud of $H_2$ was observed when generated at the cathode of the cell. The production of $H_2$ was massive, which demonstrates the use of the cell for in-situ $H_2$ production.

Figure 15:
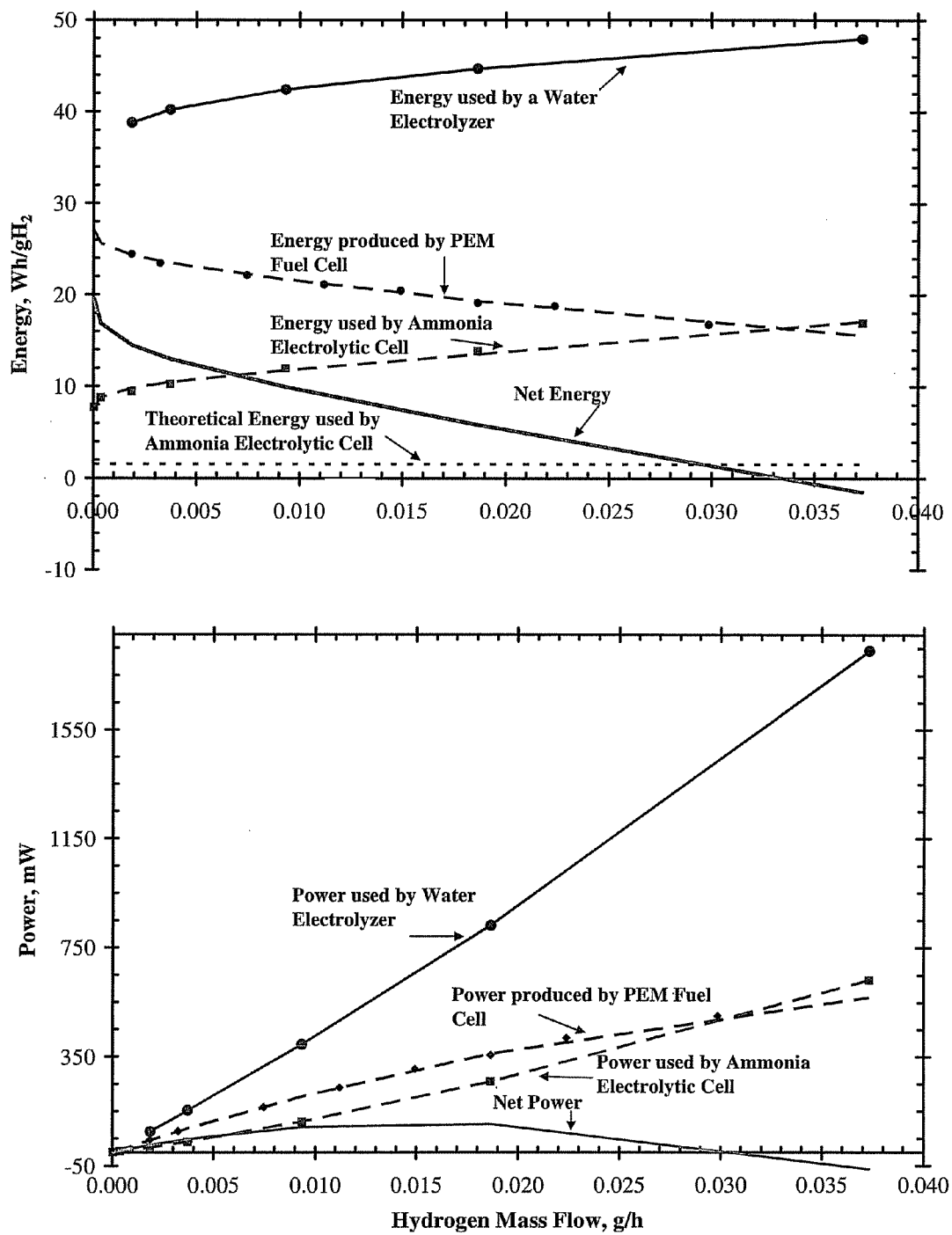
FIG. 15 shows energy (a) and Power balance (b) of an ammonia electrochemical cell, exhibiting a low energy consumption compared to that of a commercial water electrolyzer.

FIG. 15 shows the energy balance and the power balance on the ammonia electrochemical cell. The electrochemical cell outperforms a commercial water electrolyzer. Both the energy and the power balance of the cell indicate that the cell could operate by utilizing some energy produced by a PEM $H_2$ fuel cell, and the system (ammonia electrolytic cell/PEM fuel cell) will still provide some net energy. This arrangement can be used to minimize hydrogen storage.

In one exemplary system, an excess of 480 kg of $H_2$ was produced per day. A total capital investment of $1,000,000 is needed for the construction of the power system. A comparison of the economic analysis for the production of $H_2$ using the ammonia continuous electrolytic cell with current state of the art technologies (natural gas reforming and water electrolysis) for distributed power has been performed. The continuous ammonia electrolyzer can produce hydrogen at less than $2 per Kg. Compared to other technologies for in situ hydrogen production, savings are substantial—using numbers provided by the National Academy of Science, the continuous ammonia electrolyzer produced H2 about 20% cheaper than H2 can be produced using natural gas steam reforming, and about 57% cheaper than using water electrolysis.

The present electrochemical cell can be made using the following method:

A first electrode can be formed by combining at least one active metal layer with a carbon support, as described previously. In an embodiment, at least one second metal layer can also be combined with the carbon support. The combining of the layers with the carbon support can be performed using electrodeposition.

The schematic for the construction of the electrode is shown if FIG. 7. The plating procedure can include two steps: 1. First layer plating and 2. Second layer plating.

First layer plating includes plating the carbon support with materials that show a strong affinity for OH. Examples include, but are not limited to Rh, Ru, Ni, and Pd. In one preferred embodiment, Rh is used. The first layer coverage should completely plate the carbon support. In some embodiments, the first layer coverage is at least 2 mg/cm of carbon fiber to guarantee a complete plating of the carbon support. In other embodiments, the first layer coverage can be 2.5 mg/cm, 3.0 mg/cm, 3.5 mg/cm, or more.

Second layer plating includes plating the electrode with materials that have a strong affinity for the oxidation of ammonia and/or ethanol. Examples include: Pt and Ir. Monometallic deposition and/or bimetallic deposition of these materials can be performed. Ratios of Pt:Ir can range from 100% Pt-0% Ir to 50% Pt-50% Ir.

Table I summarizes the plating conditions for the anode and the cathode of the electrochemical cell. After plating the Rhodium, the electrode is weighted. The weight corresponds to the Rhodium loading. Then, the Platinum is deposited on top of the Rhodium. After the procedure is completed, the electrode is measured again. The measurement will correspond to the total loading. The Platinum loading is obtained by subtracting the total loading from the previous Rhodium measurement. The relation of Platinum to Rhodium is then calculated as the percentage of fixed loading. Because the loading depends on the length of the fiber, another measurement should be calculated. It is known that 10 cm of fiber weights 39.1 mg, and because the weight of the fiber is known, then by proportionality, it can be known the length of the total fiber that is being used in each electrode.

Table II summarizes the general conditions of a plating bath useable to create the electrodes. During the entire plating procedure, the solution was mixed to enhance the transport of the species to the carbon support.

Table III shows examples of some electrode compositions, lengths, and loadings of active metals.

TABLE 1

Conditions for Electro-plating Technique in the Deposition of Different Metals on the Carbon Fibers and/or Carbon Nanotubes

| Metal Plated | Rhodium (Rh) | Platinum (Pt) | Nickel (Ni) |
|---|---|---|---|
| Position on the Electrode Surface: | First | Second | First |
| Geometry: | $2 \times 2$ cm$^2$ | $2 \times 2$ cm$^2$ | $4 \times 4$ cm$^2$ |
| Conditions of the Solution: | Total Volume: 250 ml | Total Volume: 250 ml | Total Volume: 500 ml |
| Composition of the Solution: | 1M HCl + Rhodium (III) Chloride (RhCl$_3$•XH$_2$O)•Rh 38.5-45.5% (different compositions, depending on loadings) | 1M HCl + Hydrogen Hexachloroplatinate (IV) Hydrate, 99.9% (H$_2$PtCl$_6$•6H$_2$O) (different compositions, depending on loadings) | Watt's Bath: Nickel Sulphate (NiSO$_4$••6H$_2$O) 280 g/L Nickel Chloride (NiCl$_2$•6H$_2$O) 40 g/L Boric Acid (H$_3$BO$_3$) 30 g/L |
| Counter Electrode: | Double Platinum Foil Purity 99.95% 20 × 50 × (0.004") | Double Platinum Foil Purity 99.95% 20 × 50 × (0.004") | Nickel Spheres (6 to 16 mm p.a.) in contact with a Nickel Foil Electrode 99.9% + % Purity (0.125 mm thick) |
| Temperature: | 70° C. | 70° C. | 45° C. |
| Time: | See Applied Current | See Applied Current | 8 h approximately |
| Loading: | 5 mg/cm of Fiber | 5 mg/cm of Fiber | Fixed Parameter, Between 6-8 mg/length of fiber |
| Applied Current: | 100 mA (30 min) + 120 mA (30-60 min), depending on loading | 40 mA (10 min) 4-60 (10 min) H-80 mA (10 min) 4-100 mA (1-2 h), depending on loading | Stairs from 100 mA, to 120 mA and then to 140 mA |

TABLE 2

General Conditions of the Plating Bath

| Pretreatment | Degreasing using acetone |
|---|---|
| Bath Type | Chloride salts in HCl |
| Solution Composition | Metal/metal ratios varied for optimum deposit composition |
| Applied Current | Galvanostatic (1 to 200 mA) |
| Deposition Time | Varied from 30 minutes to several hours |

TABLE 3

Examples of some Electrode Compositions and Loadings

| ID | Composition | Ratio Pt:Rh | Total Loading, mg | Length, cm | Mg/cm |
|---|---|---|---|---|---|
| 2x2-1 | 21% Rh-79% Pt | 3.81 | 252.5 | 30.0 | 8.4 |
| 2x2-2 | 30% Rh-70% Pt | 2.31 | 146.0 | 33.4 | 4.4 |
| 2x2-3 | 23% Rh-73% Pt | 3.44 | 151.5 | 30.5 | 5.0 |
| 2x2-4 | 30% Rh-70% Pt | 2.32 | 308.8 | 31.3 | 9.9 |
| 2x2-5 | Rh-Ir-Pt | 1.36 | 196.4 | 38.0 | 5.2 |
| 2x2-6 | 80% Rh-20% Pt | 0.25 | 169.9 | 33.3 | 5.1 |
| 2x2-7 | 100% Rh | — | 157.0 | 31.6 | 5.0 |
| 2x2-8 | 30% Rh-70% Pt | 2.30 | 160.6 | 30.9 | 5.2 |
| 2x2-9 | 100% Pt | — | 161.9 | 32.3 | 5.0 |

A second electrode is also provided. The second electrode is contemplated to include a conductor, such a carbon support plated with nickel. In an embodiment, the second electrode can be formed in a similar manner and have similar materials as the first electrode.

The current fibers can rest on a metal gauze, such as by wrapping the fibers on the gauze. Any inter material for the acidic deposition bath, if used, as well as the basic electrolyte, could be used. In an embodiment, the metal gauze can be titanium, however other conductors are also contemplated, such as nickel, stainless steel, or tungsten.

The first and second electrodes are then secured in a housing, such that a space exists between the two electrodes. The housing can include at least one inlet, for receiving ammonia, ethanol, water, basic electrolyte, or combinations thereof. The housing can be made from any nonconductive polymer, such as polypropylene, Teflon™ or other polyamides, acrylic, or other similar polymers.

The housing can further include at least two outlets. A first outlet is contemplated to receive gas produced at the cathode, and a second outlet is contemplated to receive gas produced at the anode. A third outlet could be used to remove liquid from the electrochemical cell.

A basic electrolyte and a fuel are then provided to the housing. The basic electrolyte, fuel, or combinations thereof, can be provided to the housing through one or more inlets, independently or simultaneously. The basic electrolyte and the fuel could be provided using the same inlet, or through different inlets.

In an embodiment, the electrochemical cell can be provided with the basic electrolyte and/or the fuel without use of inlets, such as by providing a fixed supply of electrolyte and/or fuel to the housing prior to sealing the housing.

The housing is then sealed, which can include using gaskets, such as gaskets made from Teflon™ or other polyamides, a sealant, a second housing, or other similar methods. The sealed housing can have any volume, depending on the quantity of fuel and/or electrolyte contained within. The sealed housing can have any shape or geometry, as needed, to facilitate stacking, storage, and/or placement of the housing within a facility.

A power source is then connected to the first and second electrodes, and current is provided from the power source. The power source can include one or more solar panels, alternate or direct current sources, wind power sources, fuel cells, batteries, other similar power sources, or combinations thereof.

The power source can be connected directly to the electrodes, or, in an embodiment, to a power input of the housing.

In a contemplated embodiment, a voltage controller can be provided to the housing to limit the voltage from the power source to no more than one volt.

In an embodiment, the method for making the electrochemical cell can include placing a separator or a membrane between the first electrode and the second electrode. It is contemplated that the membrane or separator must remain wet after contacting the solution within the cell to prevent shrinkage, retain orientation of the polymer, and retain the chemical properties of the membrane or separator.

The separator or membrane can include polypropylene, Teflon™ or other polyamides, and/or fuel cell grade asbestos.

It is contemplated that the first electrode, the second electrode, or combinations thereof, could be deposited on the separator or membrane, such as by spraying or plating, such that no separate electrodes are required in addition to the separator or membrane.

In an embodiment, the method for making the electrochemical cell can include providing one or more flow controllers to the housing. The flow controllers can be useable to distribute fuel within the cell, and to remove gas bubbles from the surface of the electrodes, for increasing the surface area of the electrodes able to be contacted.

In a contemplated embodiment, one or more sensors can be placed in one or more of the outlets for detecting ammonia, ethanol, or combinations thereof. It is also contemplated that one or more of the present electrochemical cells could be usable as sensors for detecting ammonia and/or ethanol. The electrochemical cell can be deactivated if sufficient concentrations of ammonia, ethanol, or combinations thereof are detected in the outlets, for preventing contamination of neighboring cells and/or equipment, and for preventing exposure to human operators.

It is further contemplated that the present electrochemical cell can be constructed such that the housing can itself function as the second electrode.

In this embodiment, a first electrode is formed, as described previously, and is secured within a housing formed from the second electrode, such as a housing formed at least partially from nickel.

The present electrochemical cell can be used to form one or more electrochemical cell stacks by connecting a plurality of electrochemical cells in series, parallel, or combinations thereof.

The electrochemical cell stack can include one or more bipolar plates disposed between at least two adjacent electrochemical cells. The bipolar plate can include an anode electrode, a cathode electrode, or combinations thereof. For example, the bipolar plate could function as an anode for both adjacent cells, or the bipolar plate could have anode electrode materials deposited on a first side and cathode electrode materials deposited on a second side.

The electrochemical cell stack can have any geometry, as needed, to facilitate stacking, storage, and/or placement. Cylindrical, prismatic, spiral, tubular, and other similar geometries are contemplated.

In an embodiment, a single cathode electrode can be used as a cathode for multiple electrochemical cells within the stack, each cell having an anode electrode.

In this embodiment, at least a first electrochemical cell would include a first electrode having a layered electrocatalyst, as described previously, and a second electrode having a conductor.

At least a second of the electrochemical cells would then have a third electrode that includes the layered electrocatalyst. The second electrode would function as the cathode for both the first and the second electrochemical cells.

In a contemplated embodiment, an electrochemical cell stack having a plurality of anode electrodes having the layered electrocatalyst and a single cathode having a conductor can be used. For example, multiple disc-shaped anode electrodes can be placed in a stacked configuration, having single cathode electrode protruding through a central hole in each anode electrode.

A basic electrolyte and ammonia, ethanol, or combinations thereof can then be placed in contact with each of the plurality of anode electrodes and with the cathode electrode.

It is contemplated that this embodiment of the electrochemical cell stack can include a hydrogen-permeable membrane for facilitating collection of the hydrogen produced by the electrochemical cell stack.

The described embodiment of the electrochemical cell stack can further have a fuel and current inlet in communication with each of the plurality of anodes, simultaneously, such as by extending through the central hole of each of the anodes.

Referring now to FIG. 1, FIG. 1 depicts a diagram of the components of the present electrochemical cell (10).

The electrochemical cell (10) is depicted having a first electrode (11), which functions as an anode. The first electrode (11) is shown having a layered electrocatalyst (12) deposited on a carbon support (26). The layered electrocatalyst (12) is contemplated to include at least one active metal layer and can include at least one second metal layer.

The electrochemical cell (10) further depicts a second electrode (13) that functions as a cathode, which is contemplated to include a conductor.

The electrodes (11, 13) are disposed within a housing (5), such that a space exists between the electrodes (11, 13).

The electrochemical cell (10) is shown containing a basic electrolyte (36), such as sodium hydroxide or potassium hydroxide. The electrochemical cell (10) is also shown containing ammonia (20) and ethanol (22) within the basic electrolyte (36). It is contemplated that the electrochemical cell (10) is useable for the continuous oxidation of ammonia or ethanol individually, or simultaneously.

Electrical current (34) from a power generation system (7) in communication with the electrodes (11, 13) is applied to the first electrode (11) to cause the production of hydrogen (32) through the oxidation of the ammonia (20) and/or ethanol (22).

The depicted electrochemical cell (10) is shown having a hydrophilic membrane (9) disposed between the electrodes (11, 13), which is contemplated to selectively permit hydroxide exchange.

Figure 2:
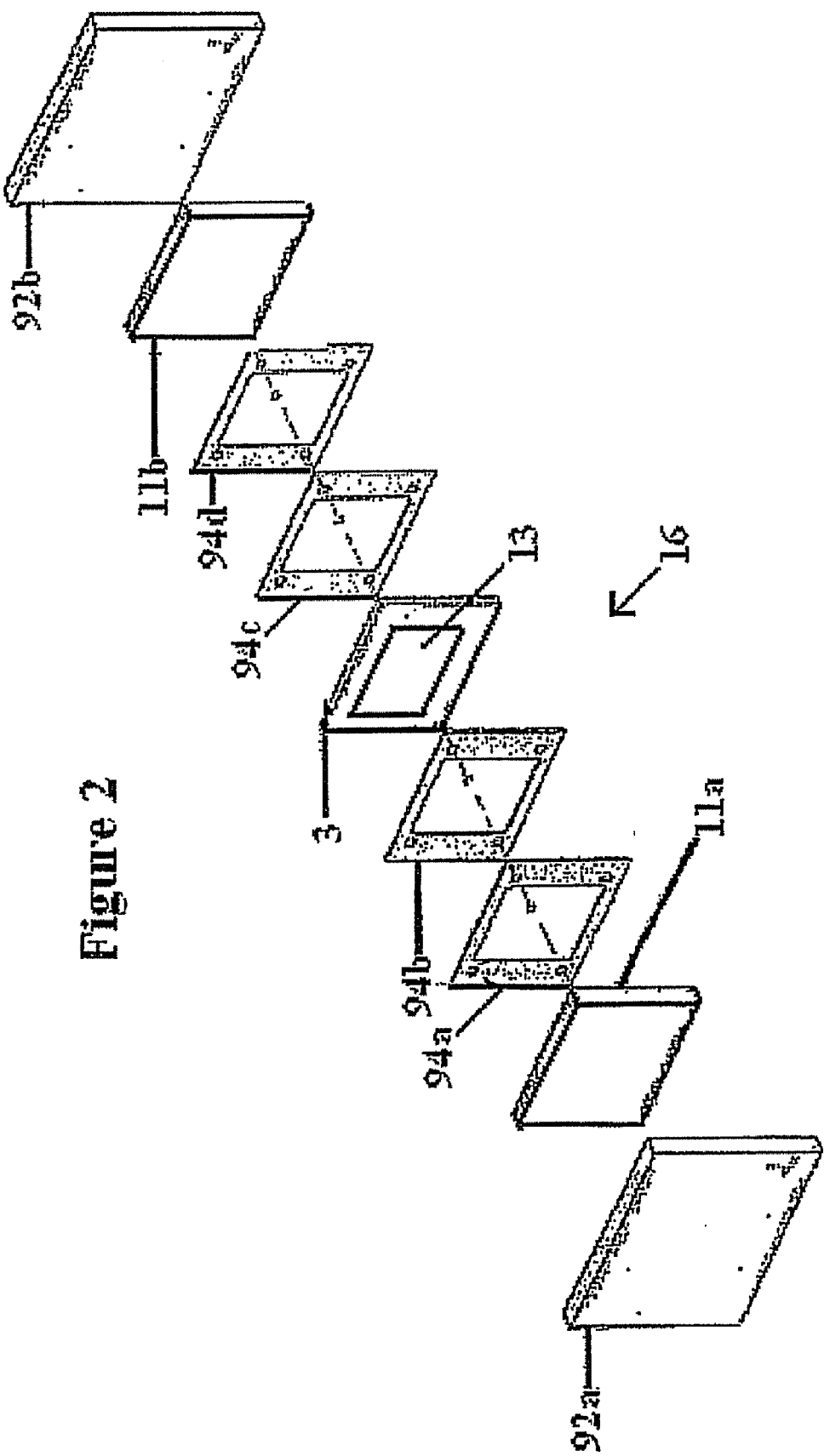
FIG. 2 depicts an exploded view of an an embodiment of an electrochemical cell stack.

Referring now to FIG. 2, a diagram of an embodiment of an electrochemical cell stack (16) is shown. The electrochemical cell stack (16) is shown having two of electrochemical cells, separated by a bipolar plate (3), which are depicted in greater detail in FIG. 1.

The electrochemical cell stack (16) includes a first anode (11a) adjacent a first end plate (92a). A first gasket (94a) and a second gasket (94b) are disposed between the first anode (11a) and the bipolar plate (3).

The electrochemical cell stack (16) also includes a second anode (11b) adjacent a second endplate (92b), opposite the first end plate (92a). A third gasket (94c) and a fourth gasket (94d) are disposed between the second anode (11b) and the bipolar plate (3).

The bipolar plate includes a cathode (13) disposed thereon. The cathode (13) is contemplated to function as a cathode for both the first anode (11a) and the second anode (11b).

While FIG. 2 depicts the electrochemical cell stack (16) including two electrochemical cells, it should be understood that any number of electrochemical cells, such as five cells or nine cells, can be stacked in a similar fashion, to produce a desired volume of hydrogen.

Figure 16:
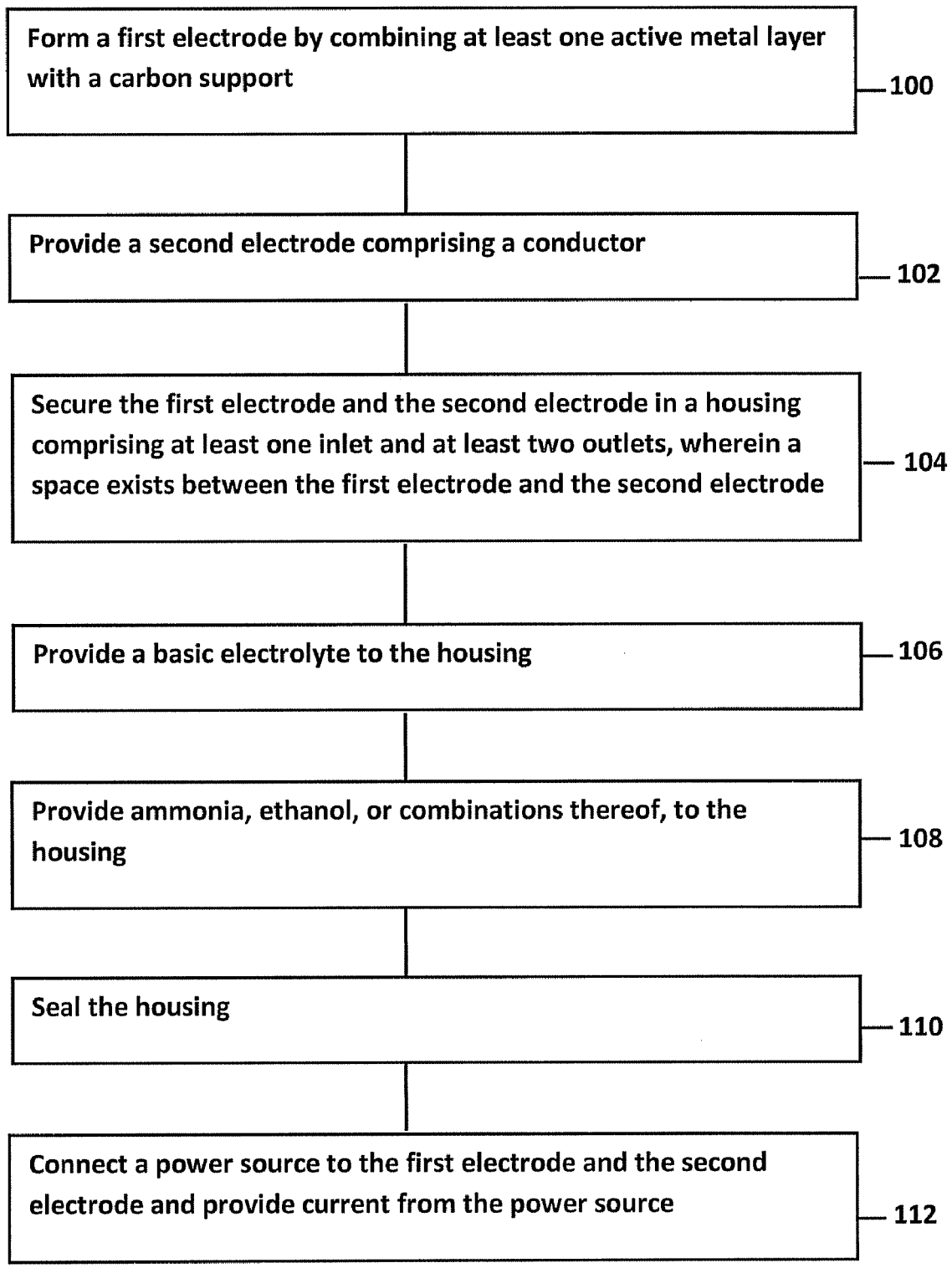
FIG. 16 depicts an embodiment of a method for making the present electrochemical cell.

Referring now to FIG. 16, a diagram of an embodiment of a method for making the present electrochemical cell is shown.

FIG. 16 depicts that a first electrode is formed by combining one or more active metal layers and, optionally, a second metal layer with a carbon support, such as by electrodeposition. (100). A second electrode having a conductor is provided (102).

The first and second electrodes are secured in a housing having at least one inlet and at least two outlets (104), with a space existing between the electrodes.

A basic electrolyte is provided to the housing (106). A fuel is also provided to the housing (108). The housing is then sealed (110), such as by using gaskets, a sealant, a second housing, or through other similar means.

A power source is then connected to the electrodes, and current is supplied (112).

While these embodiments have been described with emphasis on the embodiments, it should be understood that within the scope of the appended claims, the embodiments might be practiced other than as specifically described herein.

What is claimed is:

1. An electrochemical cell for causing a reaction that produces hydrogen, the electrochemical cell comprising:
    a first electrode comprising: at least one layered electrocatalyst, wherein the at least one layered electrocatalyst comprises:
        a carbon support integrated with a conductive metal;
        at least one active metal layer comprising platinum, or platinum and iridium at least partially deposited on the carbon support, wherein the at least one active metal layer is active to a target species, and wherein the at least one active metal layer has regions of varying thickness with at least one region having a thickness ranging from 10 nanometers to 10 microns; and
        at least one second metal layer comprising at least one of palladium, rhodium, or ruthenium deposited on the carbon support, wherein the at least one second metal layer is active to OH adsorption and inactive to the target species, and wherein the at least one second metal layer has regions of varying thickness with at least one region having a thickness ranging from 10 nanometers to 10 microns;
    a second electrode comprising a conductor;
    a basic electrolyte;
    ammonia, ethanol, or combinations thereof; and
    electrical current in communication with the first electrode.

2. The electrochemical cell of claim 1, wherein the electrical current is provided from a power generation system.

3. The electrochemical cell of claim 1, wherein the basic electrolyte has a volume that exceeds stoichiometric proportions of the reaction.

4. The electrochemical cell of claim 1, wherein the basic electrolyte has a concentration ranging from 0.1M to 7M.

5. The electrochemical cell of claim 1, wherein the ammonia, ethanol, or combinations thereof, has a concentration of ranging from 0.01 Molar to 5 Molar.

6. The electrochemical cell of claim 1, wherein the second electrode evolves hydrogen in the presence of an alkaline media.

7. The electrochemical cell of claim 1, wherein the second electrode comprises carbon, platinum, rhenium, palladium, nickel, Raney Nickel, iridium, vanadium, cobalt, iron, ruthenium, molybdenum, another electrode, or combinations thereof.

8. The electrochemical cell of claim 1, wherein the first and second electrodes each comprise a layered electrocatalyst.

9. The electrochemical cell of claim 1, wherein the first electrode, the second electrode, or combinations thereof, comprise a rotating disk electrode, a rotating ring electrode, a cylinder electrode, a spinning electrode, an ultrasound vibration electrode, or combinations thereof.

10. The electrochemical cell of claim 1, further comprising a hydrophilic membrane.

11. The electrochemical cell of claim 10, wherein the hydrophilic membrane exchanges only hydroxide.

12. The electrochemical cell of claim 10, wherein the hydrophilic membrane comprises polypropylene, polyamide, another hydrophilic polymer, or combinations thereof.

13. The electrochemical cell of claim 1, further comprising a separator.

14. The electrochemical cell of claim 13, wherein the separator comprises polypropylene, glassy carbon, or combinations thereof.

15. An electrochemical cell for causing a reaction that produces hydrogen, the electrochemical cell comprising:
    a first electrode comprising: at least one layered electrocatalyst, wherein the at least one layered electrocatalyst comprises:
        a conductive support;
        at least one active metal layer comprising platinum, or platinum and iridium at least partially deposited on the conductive support, wherein the at least one active metal layer is active to a target species, and wherein the at least one active metal layer has regions of varying thickness with at least one region having a thickness ranging from 10 nanometers to 10 microns; and
        at least one second metal layer comprising at least one of palladium, rhodium, or ruthenium deposited on the conductive support, wherein the at least one second metal layer is active to OH adsorption and inactive to the target species, and wherein the at least one second metal layer has regions of varying thickness with at least one region having a thickness ranging from 10 nanometers to 10 microns;
    a basic electrolyte;
    ammonia, ethanol, or combinations thereof; and
    electrical current in communication with the first electrode.

* * * * *